United States Patent
Morita

(10) Patent No.: US 12,157,787 B2
(45) Date of Patent: Dec. 3, 2024

(54) RESIN COMPOSITION, METHOD OF MANUFACTURING ADHESIVE MEMBER INCLUDING PROVIDING THE RESIN COMPOSITION, AND DISPLAY DEVICE INCLUDING THE ADHESIVE MEMBER

(71) Applicant: Samsung Display Co., Ltd., Yongin-si (KR)

(72) Inventor: Keisuke Morita, Yokohama (JP)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/073,387

(22) Filed: Dec. 1, 2022

(65) Prior Publication Data

US 2023/0265224 A1 Aug. 24, 2023

(30) Foreign Application Priority Data

Feb. 23, 2022 (KR) .................. 10-2022-0023371

(51) Int. Cl.
*C08F 30/02* (2006.01)
*C08F 20/06* (2006.01)
(Continued)

(52) U.S. Cl.
CPC .............. *C08F 30/02* (2013.01); *C08F 20/06* (2013.01); *C08F 130/02* (2013.01);
(Continued)

(58) Field of Classification Search
CPC ...... C09J 1473/02; C09J 143/02; C08F 30/02; C08F 130/02; C08F 230/02
See application file for complete search history.

(56) References Cited

U.S. PATENT DOCUMENTS 7,232,876 B2   6/2007   Tamura et al.
10,179,445 B2  1/2019   Kobayashi et al.
(Continued)

FOREIGN PATENT DOCUMENTS

CN    111548726 A     8/2020
JP    H 10-330455 A   12/1998
(Continued)

*Primary Examiner* — Ling Siu Choi
*Assistant Examiner* — David L Miller
(74) *Attorney, Agent, or Firm* — Lewis Roca Rothgerber Christie LLP

(57) ABSTRACT

A resin composition may include at least one urethane (meth)acrylate oligomer, at least one (meth)acrylate monomer, and at least one photoinitiator. The urethane (meth)acrylate oligomer may include a first urethane (meth)acrylate oligomer derived from a phosphate ester-containing polyol represented by Formula 1, and the first urethane (meth)acrylate oligomer may have a number-average molecular weight of about 805 to about 955. Accordingly, the resin composition may exhibit the characteristics of a low viscosity before being cured, and excellent or suitable shear modulus and peel strength after being cured.

Formula 1

(Continued)

-continued

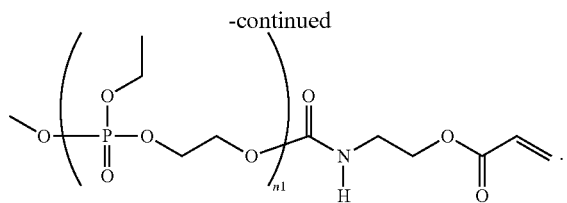

12 Claims, 10 Drawing Sheets

(51) Int. Cl.
  *C08F 130/02* (2006.01)
  *C08F 230/02* (2006.01)
  *C09J 133/10* (2006.01)
  *C09J 143/02* (2006.01)
  *C08F 20/34* (2006.01)
  *C09J 133/14* (2006.01)

(52) U.S. Cl.
  CPC ........... *C08F 230/02* (2013.01); *C09J 133/10* (2013.01); *C09J 143/02* (2013.01); *C08F 20/34* (2013.01); *C09J 133/14* (2013.01)

(56) References Cited

U.S. PATENT DOCUMENTS

| | | | |
|---|---|---|---|
| 2006/0029853 A1* | 2/2006 | Kobayashi | B01D 71/40 429/315 |
| 2020/0299424 A1 | 9/2020 | Shibuya et al. | |

FOREIGN PATENT DOCUMENTS

| | | |
|---|---|---|
| JP | 2003-212954 A | 7/2003 |
| JP | 6106355 B2 | 3/2017 |
| JP | 2019-147956 A | 9/2019 |
| JP | 6783995 B2 | 11/2020 |
| KR | 10-0627082 B1 | 9/2006 |
| KR | 10-2021-0076600 A | 6/2021 |

\* cited by examiner

RESIN COMPOSITION, METHOD OF MANUFACTURING ADHESIVE MEMBER INCLUDING PROVIDING THE RESIN COMPOSITION, AND DISPLAY DEVICE INCLUDING THE ADHESIVE MEMBER

CROSS-REFERENCE TO RELATED APPLICATION

This application claims priority to and the benefit of Korean Patent Application No. 10-2022-0023371, filed on Feb. 23, 2022, in the Korean Intellectual Property Office, the entire content of which is hereby incorporated by reference.

BACKGROUND

1. Field

One or more aspects of embodiments of the present disclosure herein relate to a resin composition, a method of manufacturing an adhesive member including providing the resin composition, and a display device including the adhesive member, and more particularly, to a resin composition including a urethane (meth)acrylate oligomer.

2. Description of Related Art

Various display devices used in multimedia devices such as a television, a mobile phone, a tablet computer, a navigation device, and/or a game console are being developed. For example, recently, display devices which are foldable, bendable, and/or rollable using flexible display members that are bendable are being under development to enable ease of portability and increase user friendliness.

It is desirable that each member used in a flexible display device secures reliability in a folding or bending operation (e.g., each member should be reliable when folded or bent). In addition, an adhesive resin used to form an adhesive layer applied to display devices in various suitable forms is required (or desired) to have reliability for members of the display devices in various suitable forms.

SUMMARY

One or more aspects of embodiments of the present disclosure are directed toward a resin composition having a low viscosity before being cured, and having excellent or suitable shear modulus and peel strength after being cured.

The present disclosure is also directed toward a method of manufacturing an adhesive member including providing the resin composition, and curing at least twice, and a display device including the adhesive member manufactured thereby. Additional aspects will be set forth in part in the description which follows and, in part, will be apparent from the description, or may be learned by practice of the presented embodiments of the disclosure.

One or more embodiments of the present disclosure provides a resin composition including at least one urethane (meth)acrylate oligomer; at least one (meth)acrylate monomer; and at least one photoinitiator, wherein the urethane (meth)acrylate oligomer includes a first urethane (meth)acrylate oligomer derived from a phosphate ester-containing polyol represented by Formula 1, and the first urethane (meth)acrylate oligomer has a number-average molecular weight of about 805 to about 955:

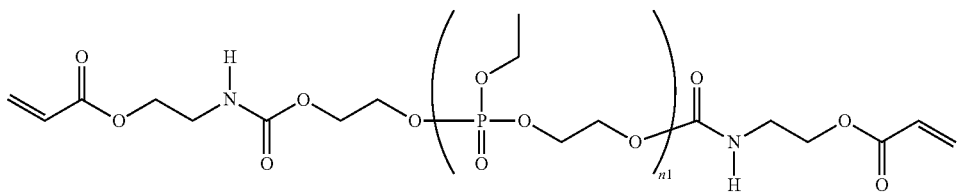

Formula 1

In Formula 1, n1 is 3 or 4.

In one or more embodiments, the (meth)acrylate monomer may have a weight percent of about 80 wt % to about 90 wt % with respect to a total weight of the resin composition.

In one or more embodiments, the resin composition may have a viscosity of about 5.0 mPa·s to about 20.0 mPa·s at about 25° C. as measured according to JIS K 7117-2 method.

In one or more embodiments, the resin composition may have a shear modulus (G') of about $1.0 \times 10^3$ Pa to about $2.0 \times 10^5$ Pa at about −20° C. as measured according to JISK7244-6 method after being UV-cured.

In one or more embodiments, the urethane (meth)acrylate oligomer may further include a second urethane (meth) acrylate oligomer containing two hydroxy groups.

In one or more embodiments, the photoinitiator may include a radical polymerization initiator.

In one or more embodiments of the present disclosure, a method of manufacturing an adhesive member may include: providing, on a substrate, a resin composition including at least one urethane (meth)acrylate oligomer, at least one (meth)acrylate monomer, and at least one photoinitiator; providing first light to the resin composition to form a preliminary adhesive member; and providing second light to the preliminary adhesive member to form an adhesive member, wherein the urethane (meth)acrylate oligomer includes a first urethane (meth)acrylate oligomer derived from a phosphate ester-containing polyol represented by Formula 1, and the first urethane (meth)acrylate oligomer has a number-average molecular weight of about 805 to about 955.

In one or more embodiments, the method of manufacturing an adhesive member may further include providing a protective member on the preliminary adhesive member after the forming of the preliminary adhesive member, and the second light may pass through the protective member and be provided to the preliminary adhesive member.

In one or more embodiments, at least one of the urethane (meth)acrylate oligomer or the (meth)acrylate monomer may include an acryloyl group, and the reaction rate of the acryloyl group in response to the providing of the first light may be about 90% or more.

The reaction rate of the acryloyl group may satisfy Equation 1:

$$Z_1 = [(X_2/Y_2)/(X_1/Y_1)] \times 100\%. \qquad \text{Equation 1}$$

In Equation 1, $X_1$ is the height of absorbance of a carbon-carbon double bond ($H_2C=CH-*$) of the acryloyl group as measured by Fourier-transform infrared spectroscopy (FT-IR) in the resin composition, $X_2$ is the height of absorbance of a carbon-carbon double bond ($H_2C=CH-*$) of the acryloyl group as measured by FT-IR in the preliminary adhesive member, $Y_1$ is the height of absorbance of a carbonyl group

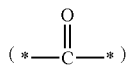

of the acryloyl group as measured by FT-IR in the resin composition, and $Y_2$ is the height of absorbance of a carbonyl group of the acryloyl group as measured by FT-IR in the preliminary adhesive member.

In one or more embodiments, the resin composition may be provided by an inkjet printing method or a dispensing method.

In one or more embodiments, a total amount of the first light may be about 450 mJ/cm² to about 550 mJ/cm², and a total amount of the second light may be about 3,500 mJ/cm² to about 4,500 mJ/cm².

In one or more embodiments of the present disclosure, a display device includes: a lower module; a display panel on the lower module; a protective member on the display panel; and an adhesive member which is between the lower module and the display panel, or between the display panel and the protective member, or on the lower module, the adhesive member including a polymer derived from a resin composition including at least one urethane (meth)acrylate oligomer, at least one (meth)acrylate monomer, and at least one photoinitiator, wherein the urethane (meth)acrylate oligomer includes a first urethane (meth)acrylate oligomer derived from a phosphate ester-containing polyol represented by Formula 1, and the first urethane (meth)acrylate oligomer has a number-average molecular weight of about 805 to about 955.

In one or more embodiments, the adhesive member may have a shear modulus of about $1.0 \times 10^3$ Pa to about $2.0 \times 10^5$ Pa at about $-20°$ C. as measured according to JISK7244-6 method.

In one or more embodiments, the adhesive member may have a 180 degree peel strength of about 800 gf/25 mm or more as measured according to JIS Z0237 method.

In one or more embodiments, the protective member may include a window.

In one or more embodiments, the lower module may include a support member, a panel protection layer on the support member, and a lower adhesive layer which is between the support member and the panel protection layer, the lower adhesive member including a polymer derived from the resin composition.

In one or more embodiments, an opening passing through the top surface and bottom surface of the lower adhesive layer may be defined in the lower adhesive layer.

In one or more embodiments, the display device may further include an input sensing unit on the display panel, and the adhesive member may be between the display panel and the input sensing unit, or between the input sensing unit and the protective member.

In one or more embodiments, the display device may include at least one folding region, and the folding region may have a radius of curvature of about 5 mm or less.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain principles of the present disclosure. In the drawings.

DETAILED DESCRIPTION

Figure 1A:
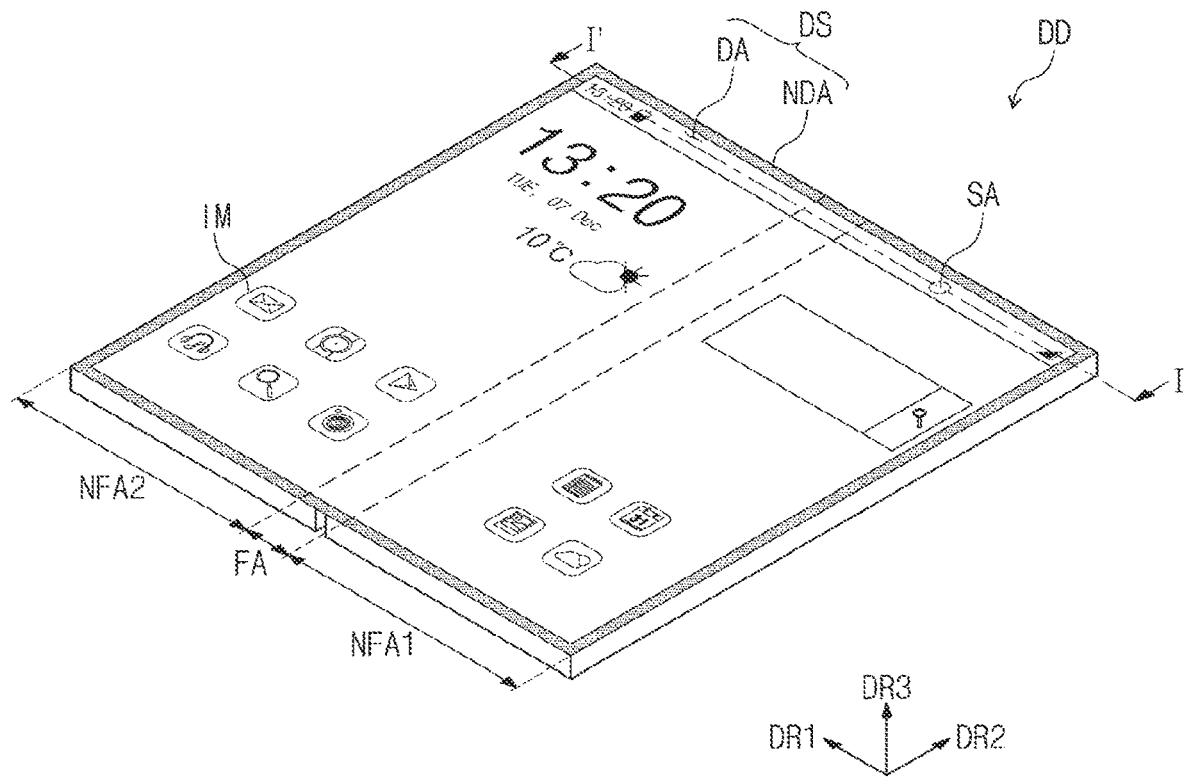
FIG. 1A is a perspective view illustrating a display device of one or more embodiments of the present disclosure.

The present disclosure may be modified in many alternate forms, and thus specific embodiments will be exemplified in the drawings and described in more detail herein below. It should be understood, however, that it is not intended to limit the present disclosure to the particular forms disclosed, but rather, is intended to cover all modifications, equivalents, and alternatives falling within the spirit and scope of the present disclosure.

In the present specification, when a component (or a region, a layer, a portion, etc.) is referred to as being "on," "connected to," or "coupled to" another component, it means that the component may be directly provided on/connected to/coupled to the other component (e.g., without any intervening components therebetween), or that a third component may be provided therebetween.

Like reference numerals refer to like elements throughout. Also, in the drawings, the thicknesses, ratios, and dimensions of the components are exaggerated for effective description of technical contents. The term "and/or" includes all of one or more combinations that can be defined by associated items.

It will be understood that, although the terms "first," "second," etc. may be used herein to describe various components, these components should not be limited by these terms. These terms are only used to distinguish one element from another. For example, a first component could be termed a second component, and, similarly, a second component could be termed a first component, without departing from the scope of the present disclosure. The terms of a singular form may include plural forms unless the context clearly indicates otherwise.

In addition, terms such as "below," "under," "on," and "above" may be used to describe the relationship between components illustrated in the figures. The terms are used as a relative concept and are described with reference to the direction indicated in the drawings.

It should be understood that the terms "comprise," or "have" are intended to specify the presence of stated features, integers, steps, operations, components, parts, or combinations thereof in the disclosure, but do not preclude the presence or addition of one or more other features, integers, steps, operations, components, parts, or combinations thereof.

Unless otherwise defined, all terms (including technical and scientific terms) used herein have the same meaning as commonly understood by one of ordinary skill in the art to which the present disclosure belongs. In addition, it will be understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the terms "use," "using," and "used" may be considered synonymous with the terms "utilize," "utilizing," and "utilized," respectively.

As used herein, expressions such as "at least one of", "one of", and "selected from", when preceding a list of elements, modify the entire list of elements and do not modify the individual elements of the list. For example, "at least one selected from a, b and c", "at least one of a, b or c", and "at least one of a, b and/or c" may indicate only a, only b, only c, both (e.g., simultaneously) a and b, both (e.g., simultaneously) a and c, both (e.g., simultaneously) b and c, all of a, b, and c, or variations thereof.

Further, the use of "may" when describing embodiments of the present disclosure refers to "one or more embodiments of the present disclosure".

As used herein, the terms "substantially", "about", and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Figure 1B:
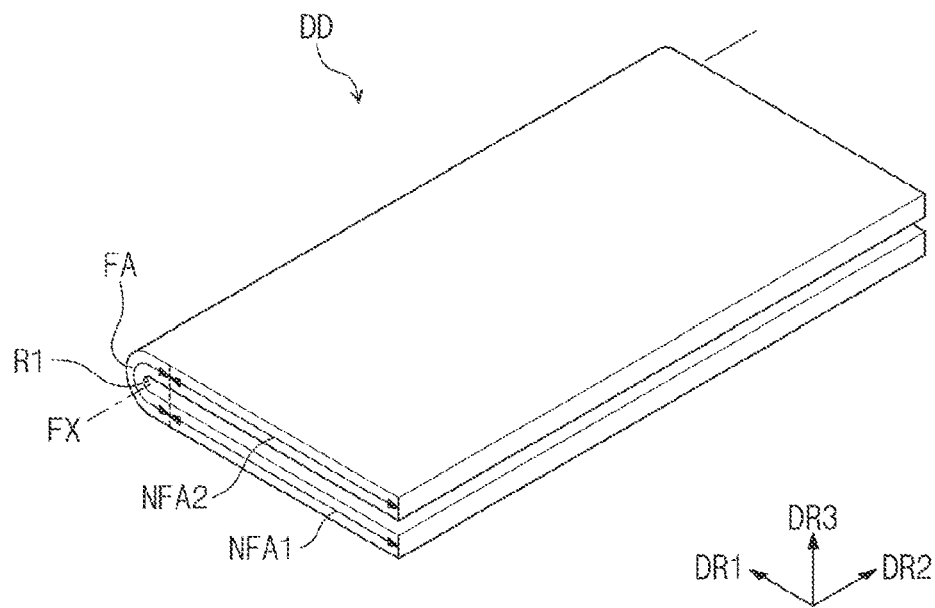
FIG. 1B is a perspective view illustrating a display device of one or more embodiments of the present disclosure.

Hereinafter, a display device and resin composition according to one or more embodiments of the present disclosure will be described with reference to the drawings. FIG. 1A is a perspective view of a display device according to one or more embodiments. FIG. 1B is a view illustrating a folded state of the display device illustrated in FIG. 1A.

The display device DD according to one or more embodiments may be a flexible display device which may be folded and/or bent or may be maintained in a folded state and/or bent state. In the specification, the term "flexible" means bendable characteristics, and is not limited to a structure that is bent and fully folded, but may include a structure that is bent up to a level of several nanometers (nm).

Referring to FIGS. 1A and 1B, a display device DD may be a device that is activated according to an electrical signal. For example, the display device DD may be a portable electronic device, a personal digital terminal, a tablet, a car navigation unit, a game console, and/or a wearable device, but the embodiment of the present disclosure is not limited thereto. FIGS. 1A and 1B exemplarily illustrate that the display device DD is a portable electronic device.

Referring to FIG. 1A, the display device DD according to one or more embodiments may include a display surface DS defined by a first directional axis DR1 and a second directional axis DR2 crossing the first directional axis DR1. The display device DD may provide an image IM for a user through the display surface DS.

The display surface DS may include a display region DA and a non-display region NDA adjacent to the display region DA. The display region DA may display the image IM, and the non-display region NDA may not display the image IM. The non-display region NDA may be around (e.g., may surround) the display region DA. However, the embodiment of the present disclosure is not limited thereto, and the shape of the display region DA and the shape of the non-display region NDA may suitably vary.

The display surface DS may further include a sensing region SA. The sensing region SA may be a portion of the display region DA. The sensing region SA may have transmittance higher than that of the display region DA. A light signal, for example, visible light and/or infrared light may move through the sensing region SA. The display device DD may include an electronic module EM (FIG. 2) that takes an external image through the visible light passing through the sensing region SA, and/or determines, through the infrared light, the access of an external object. FIG. 1A exemplarily illustrates the single sensing region SA, but the embodiment of the present disclosure is not limited thereto, and the sensing region SA may be provided in plurality.

The display device DD may have a thickness direction parallel (e.g., substantially parallel) to a third directional axis DR3 that is the normal direction with respect to a plane defined by the first directional axis DR1 and the second directional axis DR2. The directions indicated by the first to third directional axes DR1, DR2, and DR3 as described in the specification are relative concepts, and may thus be changed to other directions. In addition, the directions indicated by the first to third directional axes DR1, DR2, and DR3 may be described as first to third directions, and the same reference symbols may be used. In the specification, the first directional axis DR1 and the second directional axis DR2 are orthogonal to each other, and the third directional axis DR3 may be the normal direction with respect to the plane defined by the first directional axis DR1 and the second directional axis DR2. In the specification, the direction in which the third directional axis DR3 is extended may be parallel (e.g., substantially parallel) with the thickness direction of the display device DD, and the top and bottom surfaces of the display device DD may be spaced apart in parallel (e.g., substantially parallel) with (e.g., along) the direction in which the third directional axis DR3 is extended. In addition, in the specification, the top surface may be more adjacent to the display surface DS than the bottom surface is to the display surface DS.

The display device DD may include a folding region FA and a plurality of non-folding regions NFA1 and NFA2. The non-folding regions NFA1 and NFA2 may include a first non-folding region NFA1 and a second non-folding region NFA2. A first non-folding region NFA1, a folding region FA, and a second non-folding region NFA2 may be provided in this order in the first directional axis DR1.

FIGS. 1A and 1B illustrate that the display device DD includes one folding region FA and two non-folding regions NFA1 and NFA2, but the number of folding and non-folding regions is not limited thereto. For example, the display device may include three or more non-folding regions and two or more folding regions provided between adjacent non-folding regions.

As illustrated in FIG. 1B, the folding region FA may be folded with respect to a folding axis FX in parallel (e.g., substantially parallel) with the second directional axis DR2. The folding region FA may have a preset curvature and radius of curvature (R1). For example, the folding region FA may have a radius of curvature R1 of about 5 mm or less.

When the display device DD is folded, the non-folding regions NFA1 and NFA2 may face each other. In a fully folded state of the display device DD, the display surface DS may not be exposed to the outside, which may be referred to as inner-folding. In one or more embodiments, in a fully folded state of the display device DD of one or more embodiments, the display surface DS may be exposed to the outside, which may be referred to as outer-folding.

Figure 2:
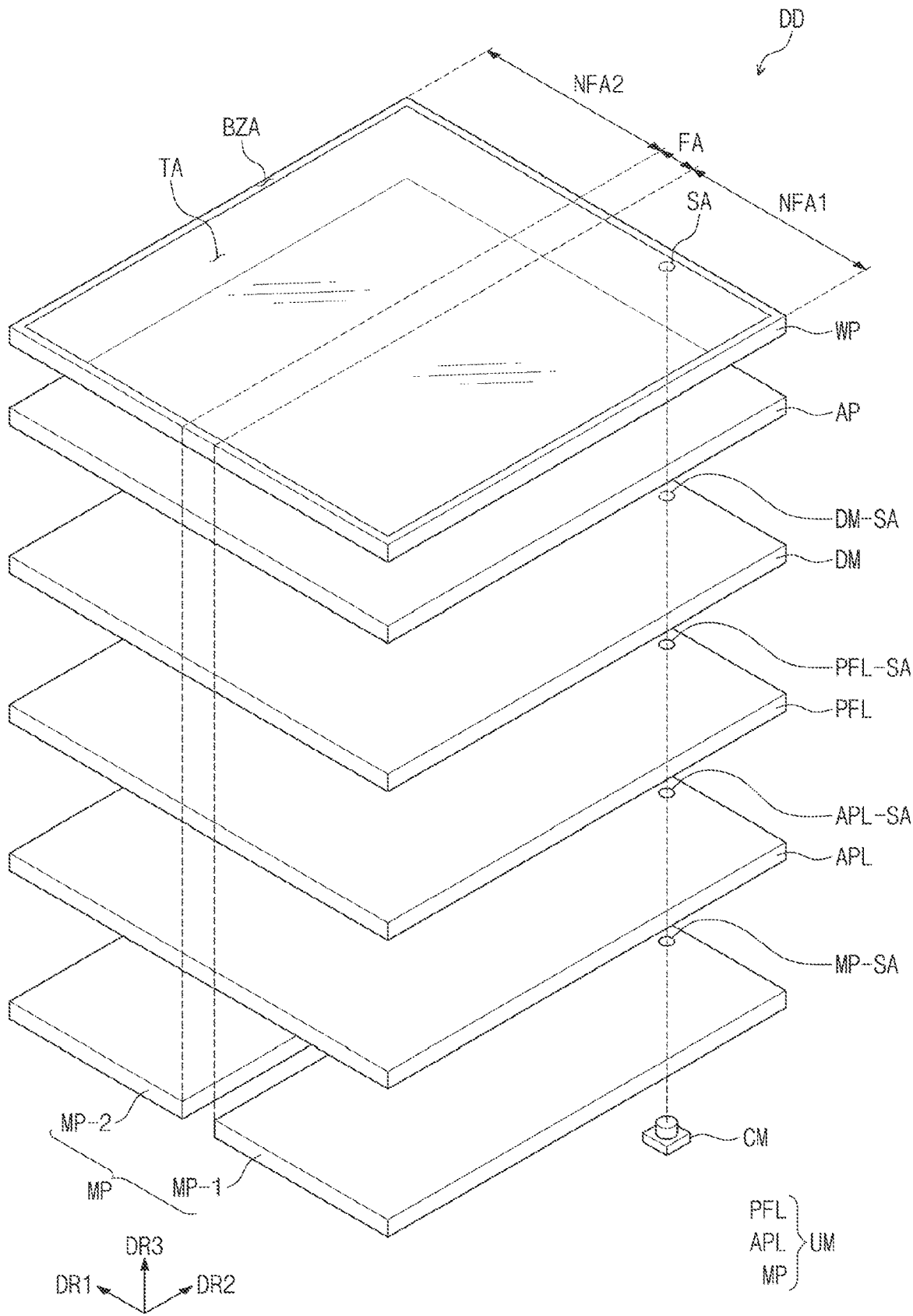
FIG. 2 is an exploded perspective view illustrating a display device of one or more embodiments.
Figure 3:
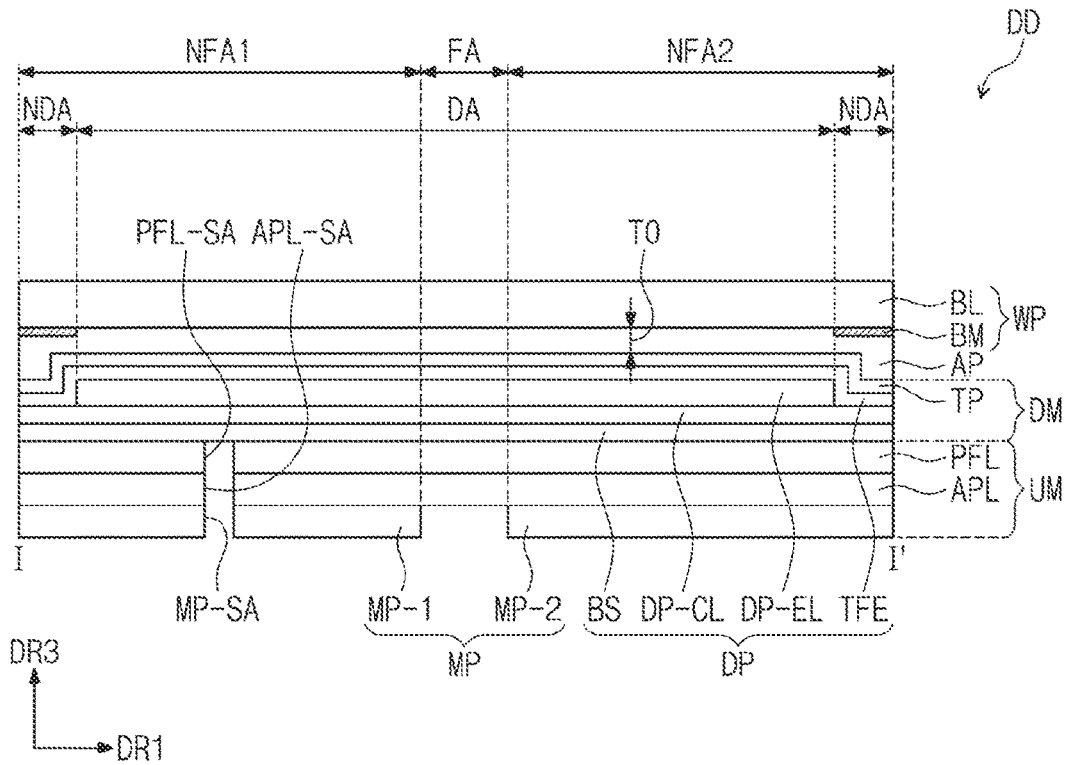
FIG. 3 is a cross-sectional view illustrating a portion taken along line I-I' of FIG. 1A.

FIG. 2 is an exploded perspective view of a display device DD according to one or more embodiments. FIG. 3 illustrates a portion corresponding to line I-I' of FIG. 1A, and is a cross-sectional view of the display device DD according to one or more embodiments.

Referring to FIGS. 2 and 3, the display device DD of one or more embodiments may include a lower module UM, a display module DM provided on the lower module UM, and a protective member WP provided on the display module DM. In the display device DD of one or more embodiments, the display module DM may include a display panel DP including a display element layer DP-EL, and an input sensing unit TP provided on the display panel DP. The display device DD of one or more embodiments may include an adhesive member AP. The adhesive member AP may be provided between the lower module UM and the display panel DP, between the display panel DP and the protective member WP, and/or on (e.g., may be a part of) the lower module UM. FIG. 2 illustrates that the adhesive member AP is provided between the display panel DP and the protective member WP, but the embodiment of the present disclosure is not limited thereto. For example, the adhesive member may be provided each of between the lower module UM and the display panel DP, and between the display panel DP and the protective member WP. The adhesive member may be provided each of between the lower module UM and the display panel DP, between the display panel DP and the protective member WP, and on (e.g., may be a part of) the lower module UM. The adhesive member AP may be formed of the resin composition of one or more embodiments, and may be formed by a method of manufacturing an adhesive member, the method including providing the resin composition.

The lower module UM may include a support member MP, a panel protection layer PFL provided on the support member MP, and a lower adhesive layer APL provided between the support member MP and the panel protection layer PFL. In one or more embodiments, the lower module UM may further include a barrier layer, etc. provided between the support member MP and the panel protection layer PFL. In some embodiments, the lower module UM may further include an adhesive layer which is provided between the barrier layer and the support member MP and/or between the barrier layer and the panel protection layer PFL, and is formed from the resin composition of one or more embodiments. In one or more other embodiments, the adhesive layer which is provided between the barrier layer and the support member MP and/or between the barrier layer and the panel protection layer PFL may include a suitable adhesive.

The support member MP may support the components such as the display module DM provided on the upper portion of the support member MP. The support member MP may include a first support plate MP-1 and a second support plate MP-2 which are spaced apart from the folding region FA. The first support plate MP-1 may overlap the first non-folding region NFA1, and the second support plate MP-2 may overlap the second non-folding region NFA2. A first auxiliary opening MP-SA overlapping the sensing region SA may be defined in the first support plate MP-1. The first auxiliary opening MP-SA may pass through the top and bottom surfaces of the first support plate MP-1.

The panel protection layer PFL may protect the display panel DP (see FIG. 3). The panel protection layer PFL may include a flexible polymer resin. For example, the panel protection layer PFL may include polyethylene terephthalate (PET). A second auxiliary opening PFL-SA overlapping the sensing region SA may be defined in the panel protection layer PFL. The second auxiliary opening PFL-SA may pass through the top and bottom surfaces of the panel protection layer PFL.

The lower adhesive layer APL may be formed from the resin composition of one or more embodiments. The lower adhesive layer APL may correspond to the case where the adhesive member AP is provided on (e.g., as a part of) the lower module UM. An opening APL-SA passing through the top and bottom surfaces of the lower adhesive layer APL may be defined in the lower adhesive layer APL. The opening APL-SA of the lower adhesive layer APL may overlap the sensing region SA. In the sensing region SA, the first auxiliary opening MP-SA of the first support plate MP-1, the opening APL-SA of the lower adhesive layer APL, and the second auxiliary opening PFL-SA of the panel protection layer PFL may overlap (e.g., may be aligned).

In some embodiments, the display device DD may include an electronic module CM provided to overlap the sensing region SA. The electronic module CM may be an electronic component that outputs and/or receives a light signal. The electronic module CM may include a camera module and/or a proximity sensor. For example, the camera module may take an external image through a sensing unit DM-SA of the display module DM. The sensing unit DM-SA of the display module DM may allow a light signal to pass therethrough, and may correspond to the sensing region SA in FIG. 1A.

The adhesive member AP may include the polymer derived from the resin composition of one or more embodiments. The adhesive member AP may be formed by the method of manufacturing an adhesive member of one or more embodiments. The resin composition of one or more embodiments may include at least one urethane (meth) acrylate oligomer, at least one (meth)acrylate monomer, and at least one photoinitiator. In the specification, the (meth) acrylate includes acrylate and methacrylate. The resin composition of one or more embodiments, and the method of manufacturing an adhesive member will be described in more detail herein below.

The display panel DP may include a base substrate BS, a circuit layer DP-CL provided on the base substrate BS, a display element layer DP-EL provided on the circuit layer DP-CL, and an encapsulation layer TFE covering the display element layer DP-EL. For example, the display panel DP may include a plurality of organic light emitting elements and/or a plurality of quantum dot light emitting elements in the display element layer DP-EL. The circuit layer DP-CL may include a plurality of transistors.

However, the configuration of the display panel DP illustrated in FIG. 3, etc. is an example, and the configuration of the display panel DP is not limited thereto. For example, the display panel DP may include a liquid crystal display element, and in this case, the encapsulation layer TFE may not be provided.

The input sensing unit TP may be provided on the display panel DP. For example, the input sensing unit TP may be directly provided on the encapsulation layer TFE of the display panel DP. The input sensing unit TP may detect an external input, convert the external input to a set or predetermined input signal, and provide the input signal for the display panel DP. For example, in the display device DD of one or more embodiments, the input sensing unit TP may be a touch sensing unit that senses a touch. The input sensing unit TP may recognize a user's direct touch, a user's indirect touch, a direct touch of an object, and/or an indirect touch of an object.

The input sensing unit TP may sense at least one of a location or force (e.g., pressure) of the externally applied touch. The input sensing unit TP may have one or more suitable structures or may be formed of one or more suitable materials, and is not limited to any one embodiment. The input sensing unit TP may include a plurality of sensing electrodes so as to sense an external input. The sensing electrodes may sense the external input in a capacitive manner. The display panel DP may receive an input signal from the input sensing unit TP, and generate an image corresponding to the input signal.

In one or more embodiments, the protective member WP may include a window. The protective member WP may protect the display panel DP, the input sensing unit TP, and the like which are provided on the lower portion of (e.g., below) the protective member WP. The image IM generated in the display panel DP may be provided to a user by passing through the protective member WP. The protective member WP may provide a touch surface of the display device DD. In the display device DD including the folding region FA, the protective member WP may include a flexible window.

The protective member WP may include a base layer BL and a printing layer BM. The protective member WP may include a transmission region TA and a bezel region BZA. The front surface of the protective member WP including the transmission region TA and the bezel region BZA may correspond to the front surface of the display device DD.

The transmission region TA may be an optically clear region. The bezel region BZA may have light transmittance relatively lower than the transmission region TA. The bezel region BZA may have a set or certain color. The bezel region BZA may be adjacent to the transmission region TA, and may be around (e.g., may surround) the transmission region TA. The bezel region BZA may define the shape of the transmission region TA. However, the embodiment of the present disclosure is not limited to the one illustrated, and the bezel region BZA may be provided adjacent to only one side of the transmission region TA, and/or a part thereof may not be provided.

The base layer BL may be a glass or plastic substrate. For example, a tempered glass substrate may be used in the base layer BL. In some embodiments, the base layer BL may be formed of a flexible polymer resin. For example, the base layer BL may be formed of polyimide, polyacrylate, polymethylmethacrylate, polycarbonate, polyethylenenaphthalate, polyvinylidene chloride, polyvinylidene difluoride, polystyrene, ethylene-vinyl alcohol copolymer, or a combination thereof. However, the embodiment of the present disclosure is not limited thereto, and any material suitable as the base layer BL of the protective member WP including the window may be used without limitation.

The printing layer BM may be provided on one surface of the base layer BL. In one or more embodiments, the printing layer BM may be provided on the bottom surface of the base layer BL adjacent to the display module DM. The printing layer BM may be provided on an edge area of the base layer BL. The printing layer BM may be an ink printing layer. In some embodiments, the printing layer BM may be a layer including a pigment and/or a dye. In the protective member WP, the bezel region BZA may be a portion in which the printing layer BM is provided.

In one or more embodiments, the protective member WP may further include at least one functional layer provided on the base layer BL. For example, the functional layer may be a hard coating layer, an anti-fingerprint coating layer, and/or the like, but the embodiment of the present disclosure is not limited thereto.

For example, the adhesive member AP may be provided between the input sensing unit TP and the protective member WP. The thickness T0 of the adhesive member AP may be about 50 μm to about 200 μm. For example, the adhesive member AP may have a thickness T0 of about 50 μm to about 100 μm. However, this is an example, and the thickness T0 of the adhesive member AP is not limited thereto.

The adhesive member AP formed from the resin composition of one or more embodiments may have a shear modulus (G') of about $1.0 \times 10^3$ Pa to about $2.0 \times 10^5$ Pa at about $-20°$ C. In some embodiments, the adhesive member AP formed from the resin composition of one or more embodiments may have a 180 degree peel strength of about 800 gf/25 mm or more (e.g., at least 800 gf/25 mm) at about $25°$ C. Accordingly, the adhesive member AP may have improved adhesive reliability, and the display device DD including the adhesive member AP may exhibit excellent or improved reliability.

By way of comparison, the adhesive member AP having a shear modulus (G') of less than about $1.0 \times 10^3$ Pa at about $-20°$ C. may be vulnerable to external impacts, and thus may not be suitable to be used in the display device. The adhesive member AP having a shear modulus (G') of greater than about $2.0 \times 10^5$ Pa at about $-20°$ C. may also not be suitable in the flexible display device.

Figure 4:
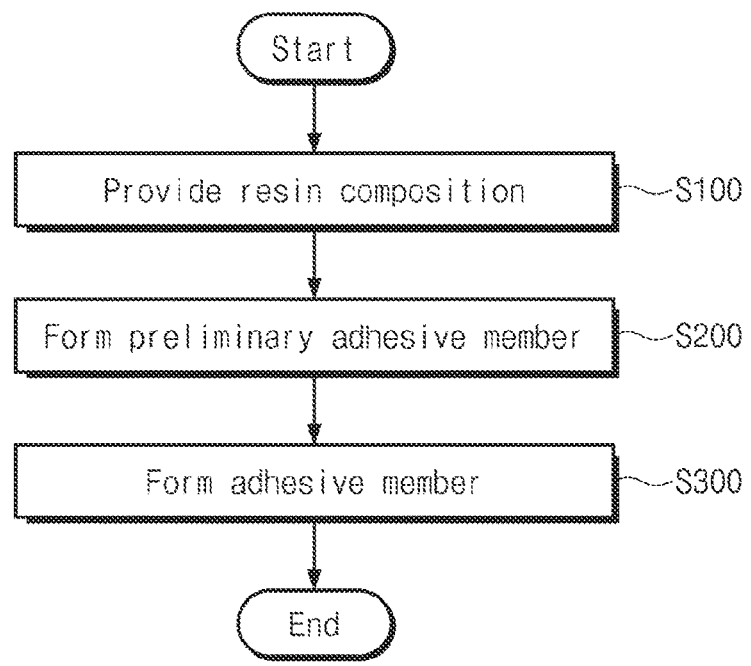
FIG. 4 is a flowchart illustrating a method of manufacturing an adhesive member of one or more embodiments.

The adhesive member AP may be formed by the method of manufacturing an adhesive member of one or more embodiments. FIG. 4 is a flowchart illustrating a method of manufacturing the adhesive member according to one or more embodiments. FIGS. 5A to 5D are views schematically illustrating an operation of the method of manufacturing an adhesive member. The method of manufacturing an adhesive member of one or more embodiments may include providing a resin composition (S100), forming a preliminary adhesive member from the resin composition (S200), and forming an adhesive member from the preliminary adhesive member (S300).

The adhesive member AP may be formed from the resin composition RC according to one or more embodiments. The resin composition RC according to one or more embodiments may include at least one (meth)acrylate monomer, at least one urethane (meth)acrylate oligomer, and at least one photoinitiator.

In the resin composition RC of one or more embodiments, the urethane (meth)acrylate oligomer may include a first urethane (meth)acrylate oligomer. The first urethane (meth)acrylate oligomer may be derived from a phosphate ester-containing polyol represented by Formula 1:

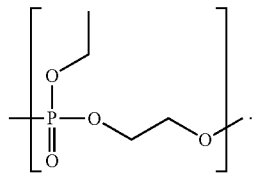

Formula 2

The first urethane (meth)acrylate oligomer derived from the phosphate ester-containing polyol represented by Formula 1 may have a number-average molecular weight (Mn) of about 805 to about 955. For example, the first urethane (meth)acrylate oligomer derived from the phosphate ester-containing polyol may have a number-average molecular weight of about 900 to about 955. In some embodiments, the first urethane (meth)acrylate oligomer derived from the phosphate ester-containing polyol may have a number-average molecular weight of about 950.

The first urethane (meth)acrylate oligomer derived from the phosphate ester-containing polyol represented by Formula 1 may include a phosphate ester group. The first urethane (meth)acrylate oligomer derived from the phosphate ester-containing polyol represented by Formula 1 may partially include an ethylene glycol chain. The first urethane (meth)acrylate oligomer derived from the phosphate ester-containing polyol represented by Formula 1 may not include a hydroxyl group.

The adhesive member AP formed from the resin composition RC including the first urethane (meth)acrylate oligomer may have a shear modulus of about $1.0 \times 10^3$ Pa to about $2.0 \times 10^5$ Pa at about $-20°$ C. The adhesive member AP formed from the resin composition RC including the first urethane (meth)acrylate oligomer may have a shear modulus of about $0.02 \times 10^6$ Pa to about $0.05 \times 10^6$ Pa at about $60°$ C. In some embodiments, the adhesive member AP formed from the resin composition RC including the first urethane (meth)acrylate oligomer may have a 180 degree peel strength of about 800 gf/25 mm or more. In one or more embodiments, the adhesive member AP formed from the

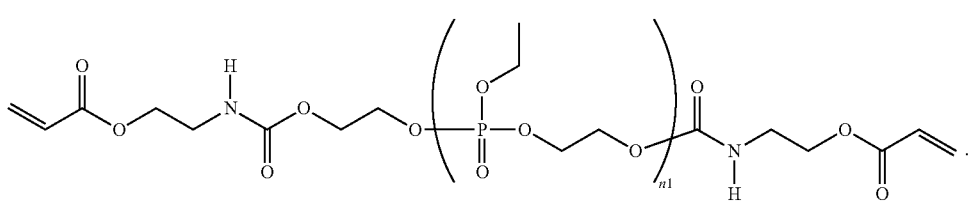

Formula 1

In Formula 1, n1 may be 3 or 4. The phosphate ester-containing polyol may include three or four phosphate ester groups. The phosphate ester-containing polyol may include two urethane bonds and two acryloyl groups. The phosphate ester-containing polyol may include an acryloyl group at the end (e.g., terminus) thereof. The phosphate ester-containing polyol may include a phosphate ester group between two urethane bonds.

Formula 1 may include three or four repeating units represented by Formula 2. Formula 2 represents a repeating unit containing a phosphate ester group.

resin composition RC including the first urethane (meth)acrylate oligomer may exhibit excellent or suitable shear modulus and excellent or suitable 180 degree peel strength.

The resin composition RC including the first urethane (meth)acrylate oligomer derived from the phosphate ester-containing polyol represented by Formula 1 may have a viscosity of about 5.0 mPa·s to about 20.0 mPa·s at about $25°$ C. as measured according to JIS K7117-2 method (Plastics—Polymers/resins in the liquid state or as emulsions or dispersions—Determination of viscosity using a rotational viscometer with defined shear rate). The resin composition RC having a viscosity of about 5.0 mPa·s to about 20.0 mPa·s at about 25° C. may be provided by an inkjet printing method and/or a dispensing method. The resin composition RC of one or more embodiments may be provided in a uniform (or substantially uniform) quantity at a uniform (or substantially uniform) speed from a device such as an inkjet printer and/or a dispenser. Accordingly, the method of manufacturing an adhesive member including providing the resin composition RC of one or more embodiments may have an improvement in the manufacture reliability.

By way of comparison, the resin composition having a viscosity of less than about 5.0 mPa·s at about 25° C. may have the occurrence of flow. The flow of the resin composition means the phenomenon in which the resin composition flows out of the part to be provided. The resin composition having a viscosity of greater than about 20.0 mPa·s at about 25° C. has a high viscosity, and thus may not be provided at a uniform (or substantially uniform) speed and/or in a uniform (or substantially uniform) quantity when provided by an inkjet printer or a dispenser.

The resin composition RC including the first urethane (meth)acrylate oligomer derived from the phosphate ester-containing polyol represented by Formula 1 may have a shear modulus of about $1.0 \times 10^3$ Pa to about $2.0 \times 10^5$ Pa at about −20° C. after being cured as measured according to JISK7244-6 method (Determination of Dynamic Mechanical Properties of plastics, Part 6: Shear Vibration—Non-resonance Method). The resin composition RC including the first urethane (meth)acrylate oligomer derived from the phosphate ester-containing polyol represented by Formula 1 may have a shear modulus of about $0.02 \times 10^6$ Pa to about $0.05 \times 10^6$ Pa at about 60° C. after being cured as measured according to JISK7244-6 method. The resin composition RC including the first urethane (meth)acrylate oligomer derived from the phosphate ester-containing polyol represented by Formula 1 may have a 180 degree peel strength of about 800 gf/25 mm or more after being cured as measured according to JIS Z0237 method (Testing methods of pressure-sensitive adhesive tapes and sheets). The liquid resin composition RC may be cured by light, and for example, the liquid resin composition RC may be cured by ultraviolet light UV-1 (see FIG. 5B). As the resin composition RC is cured, the adhesive member AP of one or more embodiments may be formed.

With respect to the total weight of the resin composition RC, the first urethane (meth)acrylate oligomer may have a weight percent of about 5 wt % to about 15 wt %. For example, with respect to the total weight of the resin composition RC, the first urethane (meth)acrylate oligomer may have a weight percent of about 5 wt %, about 12 wt %, or about 15 wt %. However, this is an example, and with respect to the total weight of the resin composition RC, the weight percent of the first urethane (meth)acrylate oligomer is not limited thereto.

In the resin composition RC of one or more embodiments, the urethane (meth)acrylate oligomer may further include a second urethane (meth)acrylate oligomer containing two hydroxy groups. For example, the urethane (meth)acrylate oligomer may include at least one of UF-C052 (Kyoeisha Chemical Co., Ltd.) or UN6304 (Negami Chemical Industrial Co., Ltd.) as the second urethane (meth)acrylate oligomer. With respect to the total weight of the resin composition RC, the second urethane (meth)acrylate oligomer may have a weight percent of about 3 wt % to about 10 wt %. However, this is an example, and the kind and weight percent of the second urethane (meth)acrylate oligomers are not limited thereto.

In the resin composition RC, the (meth)acrylate monomer may contain at least one (meth)acryloyl group per monomer unit. In the present specification, the (meth)acryloyl group represents an acryloyl group and/or a methacryloyl group, and (meth)acrylic represents acrylic and/or methacrylic. For example, the (meth)acrylate monomer may be an acrylate monomer and/or a methacrylate monomer containing one acryloyl group and/or one methacryloyl group.

In one or more embodiments, the (meth)acrylate monomer may have a weight percent of about 80 wt % to 90 wt % with respect to the total weight of the resin composition RC. For example, the (meth)acrylate monomer may have a weight percent of about 85 wt % with respect to the total weight of the resin composition RC.

The resin composition RC may include a plurality of (meth)acrylate monomers. For example, the resin composition RC may include three different (meth)acrylate monomers. When the resin composition RC includes three (meth)acrylate monomers, with respect to the total weight of the resin composition, two (meth)acrylate monomers may each independently have a weight percent of about 20 wt % to about 30 wt %, and the remaining one (meth)acrylate monomer may have a weight percent of about 30 wt % to about 40 wt %.

The (meth)acrylate monomer may include at least one of a hydroxy group-containing (meth)acrylate, an alkyl (meth)acrylate, or an alicyclic (meth)acrylate. In the resin composition RC, the (meth)acrylate monomer may include at least one of 2-ethylhexyl acrylate (2-EHA), 4-hydroxybutyl acrylate (4-HBA), or ethoxy-diethylene glycol acrylate (EC-A). However, this is an example, and the kind and weight percent of the (meth)acrylate monomers are not limited thereto.

The resin composition RC of one or more embodiments may include a photoinitiator. The photoinitiator may include a radical polymerization initiator. When the resin composition RC includes a plurality of photoinitiators, different photoinitiators may be activated by ultraviolet light having different center wavelengths.

For example, the photoinitiator may be at least one of bis(2,4,6-trimethylbenzoyl)-phenylphosphineoxide, 2,4,6-trimethylbenzoyl-diphenylphosphine oxide, ethyl(2,4,6-trimethylbenzoyl)phenyl phosphinate, 2,2-dimethoxy-1,2-diphenylethan-1-one, 1-hydroxy-cyclohexyl-phenyl-ketone, 2-methyl-1[4-(methylthio)phenyl]-2-morpholinopropan-1-one, or 2-benzyl-2-dimethylamino-1-(4-morpholinophenyl)-butanone-1.

In some embodiments, the photoinitiator may be at least one of 2-dimethylamino-2-(4-methyl-benzyl)-1-(4-morpholin-4-yl-phenyl)-butan-1-one, 2-hydroxy-2-methyl-1-phenyl-1-propanone, 2-hydroxy-1-[4-(2-hydroxyethoxy)phenyl]-2-methyl-1-propanone, 2-hydroxy-1-{4-[4-(2-hydroxy-2-methyl-propionyl)-benzyl]-phenyl}-2-methylpropan-1-on e, [1-(4-phenylsulfanylbenzoyl)heptylideneamino]benzoate, or [1-[9-ethyl-6-(2-methylbenzoyl)carbazol-3-yl]ethylideneamino] acetate.

For example, the (meth)acrylate monomer may have a weight percent of about 1 wt % to about 3 wt % with respect to the total weight of the resin composition RC. The resin composition may include Omnirad 819 (IGM Resins, Inc.) as a photoinitiator. However, this is an example, and the kind and weight percent of the photoinitiator included in the resin composition RC is not limited thereto.

Figure 5A:
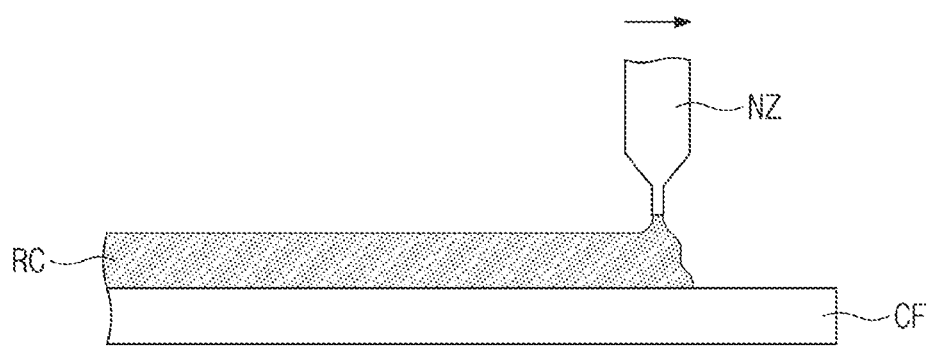
FIG. 5A is a view schematically illustrating an operation of a method of manufacturing an adhesive member of one or more embodiments.

FIG. 5A schematically illustrates an act of providing a resin composition (S100). The resin composition RC may be provided on a substrate CF. However, the embodiment of the present disclosure is not limited thereto, and the substrate on which the resin composition RC is provided may become a display module DM or a protective member WP.

For example, the substrate on which the resin composition RC is provided may include polyethylene terephthalate (PET). The substrate CF is a temporary substrate used to form a preliminary adhesive member P-AP from the resin composition RC, which may be any suitable substrate, without limitation, as long as it may be easily or suitably detached from the preliminary adhesive member P-AP after curing the resin composition. For example, release treatment may be conducted on one surface of the substrate CF on which the resin composition RC is provided.

The resin composition of one or more embodiments may have a viscosity of about 5.0 mPa·s to about 20.0 mPa·s at about 25° C. as measured according to JIS K7117-2 method. The resin composition RC having a viscosity of about 5.0 mPa·s to about 20.0 mPa·s at about 25° C. may be provided by an inkjet printing method, a dispensing method, and/or the like. The resin composition RC having a viscosity of about 5.0 mPa·s to about 20.0 mPa·s at about 25° C. may be provided in a uniform (or substantially uniform) amount at a uniform (or substantially uniform) speed from a device used for applying the resin composition RC.

FIG. 5A illustrates that the resin composition RC is provided through a nozzle NZ. The resin composition RC having a viscosity of about 5.0 mPa·s to about 20.0 mPa·s may be easily or suitably discharged from the nozzle NZ, and provided to be applied in a uniform (or substantially uniform) thickness. The resin composition RC may be provided to form a thin adhesive member AP.

Figure 5B:
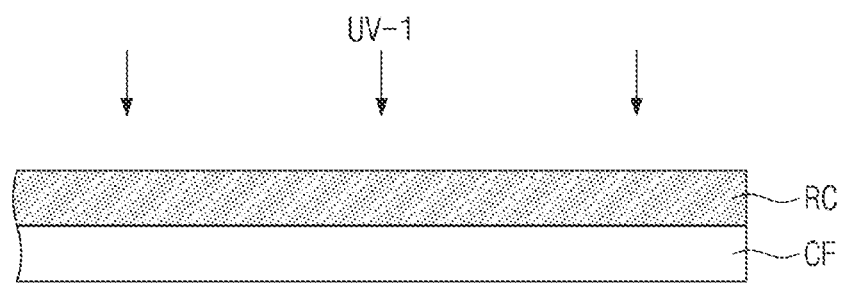
FIG. 5B is a view schematically illustrating an operation of a method of manufacturing an adhesive member of one or more embodiments.

The resin composition RC applied in a uniform (or substantially uniform) thickness on the substrate CF may be provided (e.g., with first light UV-1 to form the preliminary adhesive member P-AP. The first light UV-1 may be ultraviolet light. FIG. 5B illustrates that the resin composition RC applied on the substrated CF is directly irradiated with the first light UV-1 to form the preliminary adhesive member P-AP, but the embodiment of the present disclosure is not limited thereto. A carrier film may be provided on the resin composition RC applied in a uniform thickness, and then the first light UV-1 may be provided, and the carrier film may transmit the first light UV-1.

In the resin composition RC, the reaction rate of the acryloyl group in response to the providing of the first light UV-1 may be about 90% or more. In the resin composition RC, at least one of the urethane (meth)acrylate oligomer or the (meth)acrylate monomer may include an acryloyl group. The acryloyl group may include a carbon-carbon double bond ($H_2C=CH-*$) and a carbonyl group

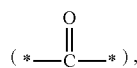

and the carbon-carbon double bond may react by a radical polymerization when provided with the first light UV-1. For example, a radical generates from the photoinitiator by the providing of the first light UV-1, and the carbon-carbon double bond may be activated by the generated radical to perform the polymerization. In this process, a ketone bonding of the carbonyl group may be decomposed or may not be produced. Meanwhile, "—*" herein means a position to be connected (e.g., a binding site).

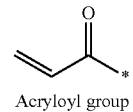

Acryloyl group

In the resin composition RC, the reaction rate of the acryloyl group in response to the providing of the first light UV-1 may be calculated by Equation 1 below. Equation 1 relates to height of absorbance of the carbon-carbon double bond and the carbonyl group as measured by Fourier-transform infrared spectroscopy (FT-IR) before and after providing the first light UV-1.

$$Z_1=[(X_2/Y_2)/(X_1/Y_1)]\times 100\% \qquad \text{Equation 1}$$

In Equation 1, $X_1$ is the height of absorbance of the carbon-carbon double bond of the acryloyl group as measured by FT-IR in the resin composition RC, and $X_2$ is the height of absorbance of the carbon-carbon double bond of the acryloyl group as measured by FT-IR in the preliminary adhesive member P-AP. $Y_1$ is the height of absorbance of the carbonyl group of the acryloyl group as measured by FT-IR in the resin composition RC, and $Y_2$ is the height of absorbance of the carbonyl group of the acryloyl group as measured by FT-IR in the preliminary adhesive member P-AP. Here, $X_1$ and $Y_1$ are measured from the resin composition RC before providing the first light UV-1, and $X_2$ and $Y_2$ are measured from the preliminary adhesive member P-AP after providing the first light UV-1. In Equation 1, $X_1$ and $X_2$ are obtained by measuring the height of absorbance of the carbon-carbon double bond, and measuring the height of the absorption peak of about 810 $cm^{-1}$. $Y_1$ and $Y_2$ are obtained by measuring the height of absorbance of the carbonyl group, and measuring the height of the absorption peak of about 1730 $cm^{-1}$. The height of the absorption peak is the height from a baseline to a peak in an FT-IR graph.

The preliminary adhesive member P-AP which is formed from the resin composition RC of one or more embodiments and in which the reaction rate of the acryloyl group is about 90% or more may have good or suitable wettability and exhibit excellent or improved shape maintenance characteristics. The preliminary adhesive member P-AP which is detached from the substrate CF and provided on one surface of the display module DM may stably or suitably maintain the shape thereof. By way of comparison, the preliminary adhesive member in which the reaction rate of the acryloyl group is less than about 90% has a change in the shape when detached from the substrate and provided on one surface of the display module, and thus defects may occur during a manufacture process.

Figure 5C:
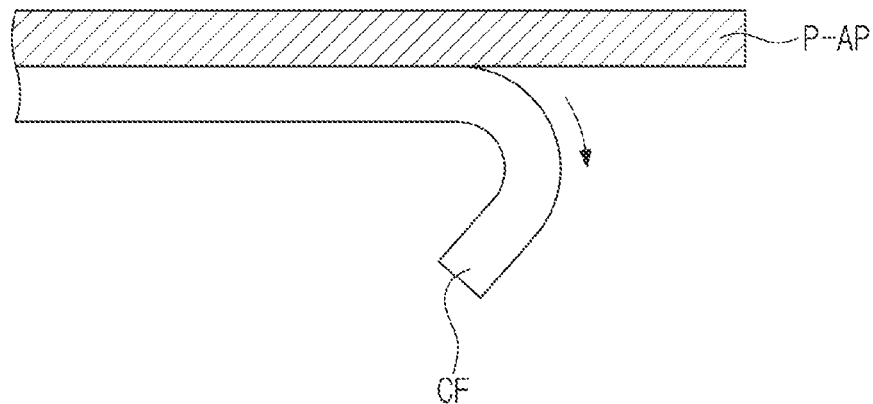
FIG. 5C is a view schematically illustrating an operation of a method of manufacturing an adhesive member of one or more embodiments.
Figure 5D:
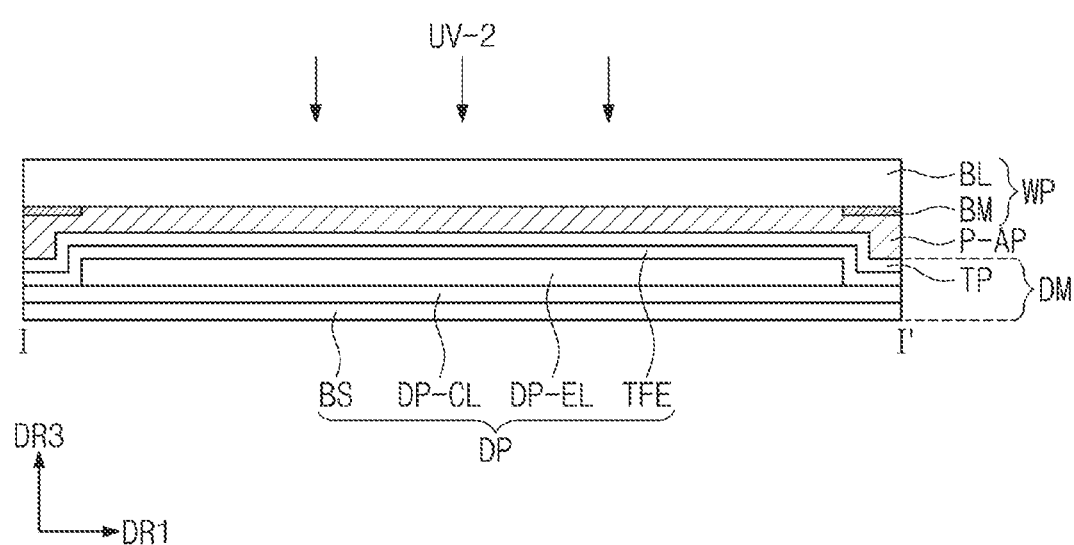
FIG. 5D is a view schematically illustrating an operation of a method of manufacturing an adhesive member of one or more embodiments.

Referring to FIGS. 5C and 5D, the preliminary adhesive member P-AP formed by irradiating the resin composition RC with the first light UV-1 may be detached from the substrate CF and provided on one surface of the protective member WP or on one surface of the display module DM. One surface of the preliminary adhesive member P-AP may be laminated on one surface of the protective member WP or on one surface of the display module DM, and one surface of the protective member WP or one surface of the display module DM, whichever has not yet been attached to the preliminary adhesive member P-AP, may be attached to the other surface of the preliminary adhesive member P-AP. In FIG. 5D, one surface of the display module DM on which the preliminary adhesive member P-AP is provided may be the top surface of the display module DM.

The preliminary adhesive member P-AP provided between the display module DM and the protective member WP may be irradiated with second light UV-2 to form the final adhesive member AP (see FIG. 3). The second light UV-2 may be provided from above the protective member WP, and the second light UV-2 may pass through the protective member WP. An upper portion and lower portion of the protective member WP may be spaced apart along the third directional axis DR3, and the lower portion of the protective member WP may be adjacent to the preliminary adhesive member P-AP. The second light UV-2 may pass through the protective member WP to be provided to the preliminary adhesive member P-AP.

The second light UV-2 may be ultraviolet light. A total amount of the second light UV-2 may be more than that of the first light UV-1. The total amount of the second light UV-2 provided to the preliminary adhesive member P-AP may be more than that of the first light UV-1 provided to the resin composition RC. The total amount of the first light UV-1 may be about 450 mJ/cm$^2$ to about 550 mJ/cm$^2$. The total amount of the second light UV-2 may be about 3,500 mJ/cm$^2$ to about 4,500 mJ/cm$^2$. For example, the total amount of the first light UV-1 may be about 500 mJ/cm$^2$, and the total amount of the second light UV-2 may be about 4,000 mJ/cm$^2$.

The method of manufacturing an adhesive member according to one or more embodiments may include providing first light to a resin composition RC to form a preliminary adhesive member P-AP and providing second light to the preliminary adhesive member P-AP to form the adhesive member AP (see FIG. 3). The resin composition RC of one or more embodiments may be provided by an inkjet printing method or a dispensing method, and the reaction rate of the acryloyl group in response to the providing of the first light UV-1 may be about 90% or more. Accordingly, the method of manufacturing an adhesive member of one or more embodiments may exhibit excellent or suitable manufacture reliability.

Figure 6A:
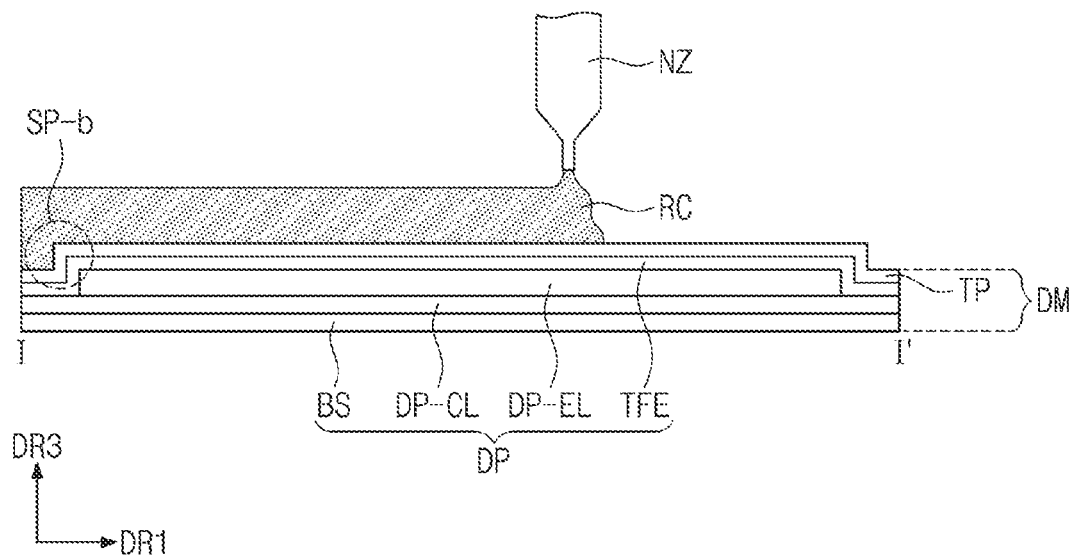
FIG. 6A is a view schematically illustrating an operation of a method of manufacturing an adhesive member of one or more embodiments.
Figure 6B:
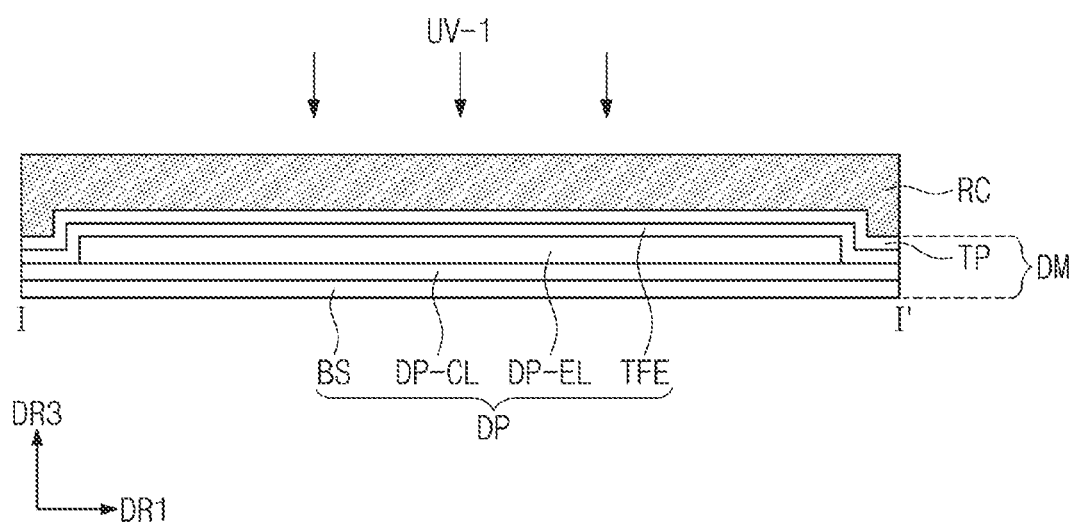
FIG. 6B is a view schematically illustrating an operation of a method of manufacturing an adhesive member of one or more embodiments.
Figure 6C:
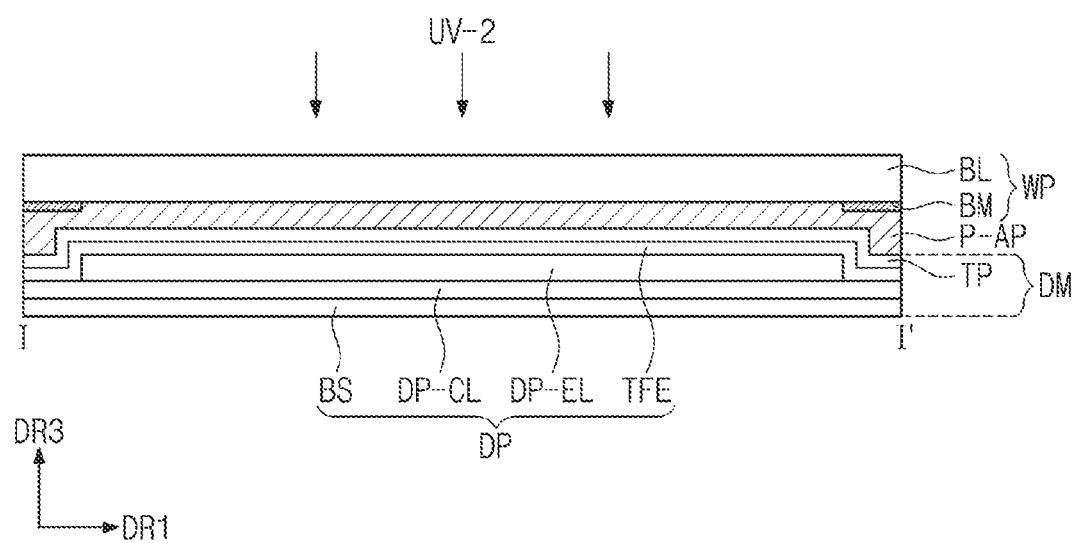
FIG. 6C is a view schematically illustrating an operation of a method of manufacturing an adhesive member of one or more embodiments.

FIGS. 6A to 6C illustrate one or more other embodiments of the method of manufacturing an adhesive member. Compared with the method of manufacturing an adhesive member of FIGS. 5A to 5C, FIGS. 6A to 6C have a difference in that the resin composition RC is provided directly on one surface of the display module DM.

Referring to FIG. 6A, the resin composition RC of one or more embodiments may be provided directly on one surface of the display module DM. The resin composition RC according to one or more embodiments may have a viscosity of about 5.0 mPa·s to about 20.0 mPa·s at about 25° C. as measured according to JIS K7117-2 method, and may be provided through a nozzle NZ. The resin composition RC having a viscosity of about 5.0 mPa·s to about 20.0 mPa·s at about 25° C. may be provided while covering the uneven portion of a stepped portion SP-b of the display module DM.

The resin composition RC has a low viscosity value of about 20.0 mPa·s or less, and thus may be applied without (or substantially without) an empty space in the uneven portion such as the stepped portion SP-b. In some embodiments, the resin composition RC having a viscosity value of about 5.0 mPa·s or more may be uniformly (or substantially uniformly) applied in a set or preset thickness without flowing out of a part, in which the resin composition RC is to be provided, e.g., the display module DM.

Referring to FIG. 6B, the first light UV-1 may be provided to the resin composition RC uniformly (or substantially uniformly) applied. As the first light UV-1 is provided to the resin composition RC, the preliminary adhesive member P-AP may be formed. The protective member WP may be provided on the preliminary adhesive member P-AP. In FIG. 6C, the second light UV-2 may pass through the protective member WP to be provided to the preliminary adhesive member P-AP.

Figure 7A:
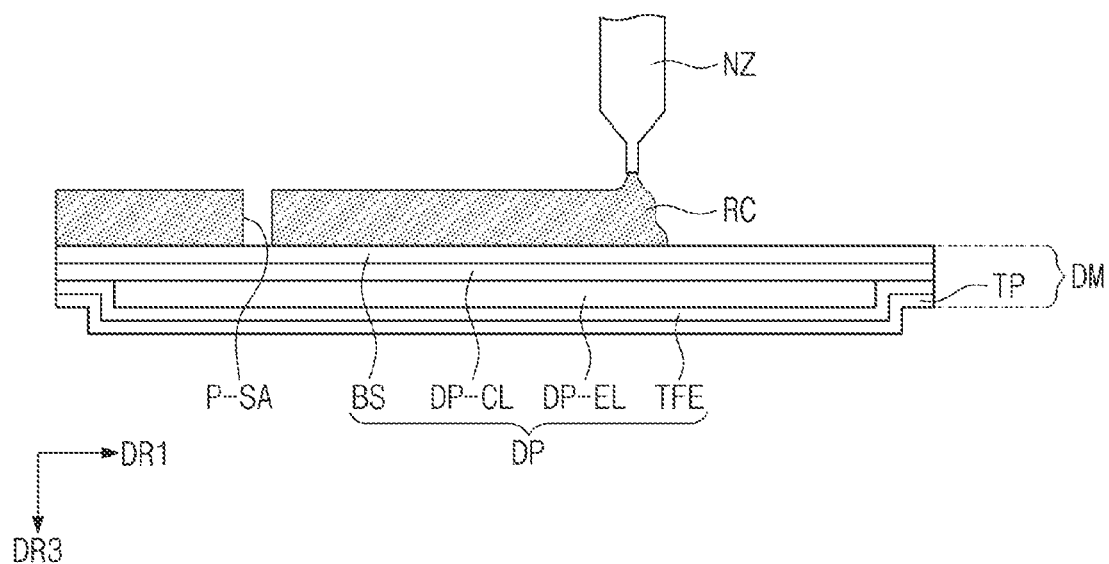
FIG. 7A is a view schematically illustrating an operation of a method of manufacturing an adhesive member of one or more embodiments.
Figure 7B:
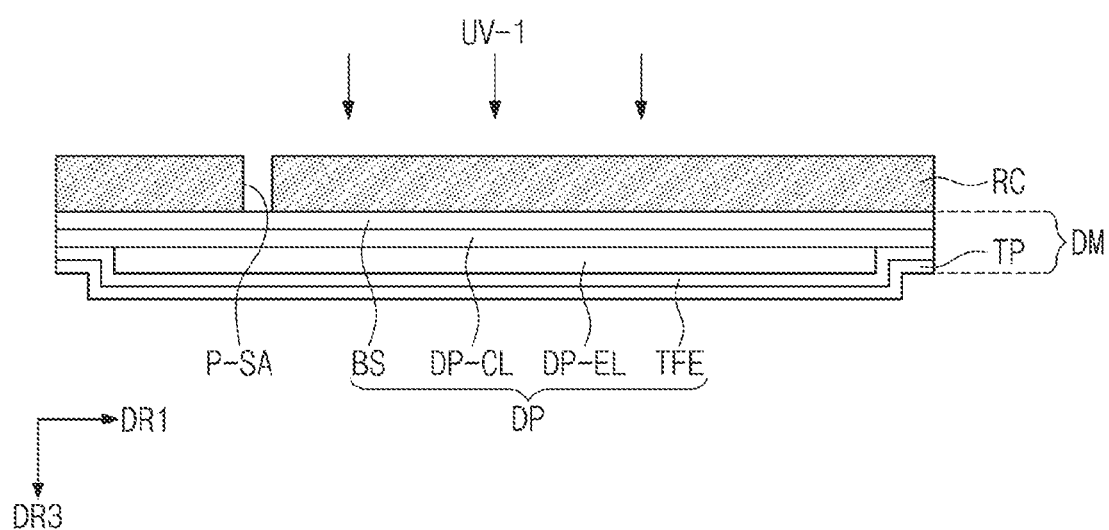
FIG. 7B is a view schematically illustrating an operation of a method of manufacturing an adhesive member of one or more embodiments.
Figure 7C:
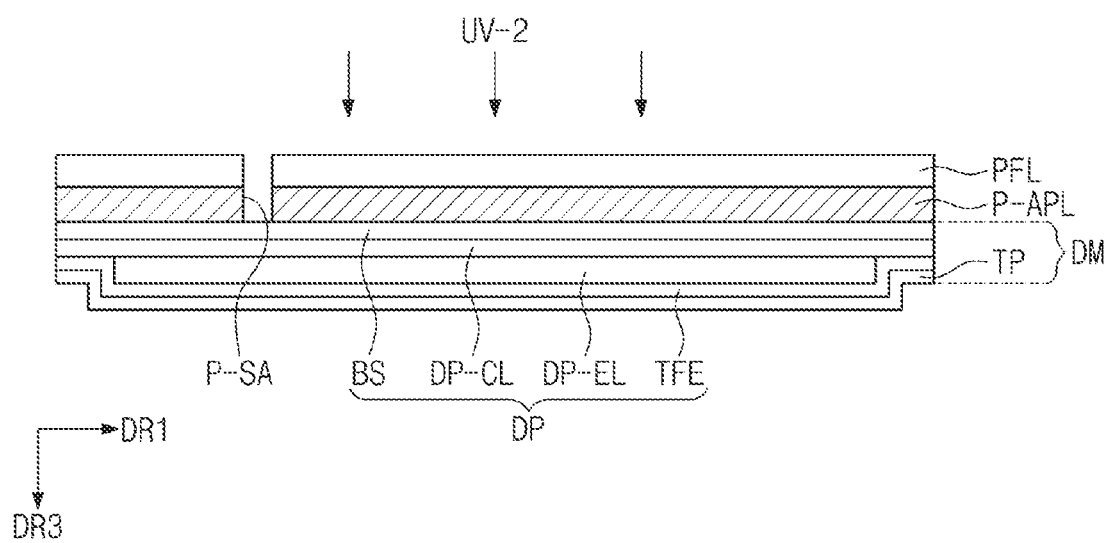
FIG. 7C is a view schematically illustrating an operation of a method of manufacturing an adhesive member of one or more embodiments.

FIGS. 7A to 7C illustrate one or more other embodiments of the method of manufacturing an adhesive member, and illustrate operations of forming the lower adhesive layer APL (see FIGS. 2 and 3) from the resin composition RC of one or more embodiments. As described above, the lower adhesive layer APL may correspond to the case where the adhesive member AP is provided on (e.g., as a part of) the lower module UM.

In one or more embodiments, the lower adhesive layer APL may include a polymer derived from the resin composition RC. The resin composition RC may include at least one urethane (meth)acrylate oligomer, at least one (meth)acrylate monomer, and at least one photoinitiator. In the resin composition RC, the urethane (meth)acrylate oligomer may include the first urethane (meth)acrylate oligomer derived from the phosphate ester-containing polyol represented by Formula 1 as described above. The first urethane (meth)acrylate oligomer may have a number-average molecular weight of about 805 to about 955.

Referring to FIG. 7A, the resin composition RC may be provided on one surface of the display module DM. In FIG. 7A, the one surface of the display module DM on which the resin composition RC is provided may be the bottom surface of the display module DM.

When the resin composition RC is provided on the bottom surface of the display module DM, the operation of the nozzle NZ may be controlled in order not to provide the resin composition RC to (e.g., to exclude the resin composition RC from) the portion P-SA overlapping the sensing region SA (see FIG. 1A). In one or more embodiments, when the resin composition RC is provided on the bottom surface of the display module DM, a mask, etc. may be provided to the portion P-SA overlapping the sensing region SA (see FIG. 1A), and thus the resin composition RC may not be provided to the portion P-SA overlapping the sensing region SA (see FIG. 1A). The opening AP-SA (see FIGS. 2 and 3) may be formed in the portion P-SA to which the resin composition RC is not provided. However, this is an example, and the embodiment of the present disclosure is not limited thereto.

Referring to FIG. 7B, the first light UV-1 may be provided to the resin composition RC uniformly (or substantially uniformly) applied. As the first light UV-1 is provided, the preliminary lower adhesive layer P-APL may be formed. FIG. 7C illustrates that the panel protection layer PFL is provided on one surface of the preliminary lower adhesive layer P-APL. The one surface of the preliminary lower adhesive layer P-APL on which the panel protection layer PFL is provided may be the bottom surface of the preliminary lower adhesive layer P-APL. The bottom surface of the preliminary lower adhesive layer P-APL may be spaced apart from the display module DM, and the top surface of the preliminary lower adhesive layer P-APL may be in contact with the display module DM.

After the panel protection layer PFL is provided, the second light UV-2 may be provided to the preliminary lower adhesive layer P-APL. The second light UV-2 may pass through the panel protection layer PFL to be provided to the preliminary lower adhesive layer P-APL. As the second light UV-2 is provided, the lower adhesive layer APL (see FIGS. 2 and 3) may be formed from the preliminary lower adhesive layer P-APL.

Figure 8:
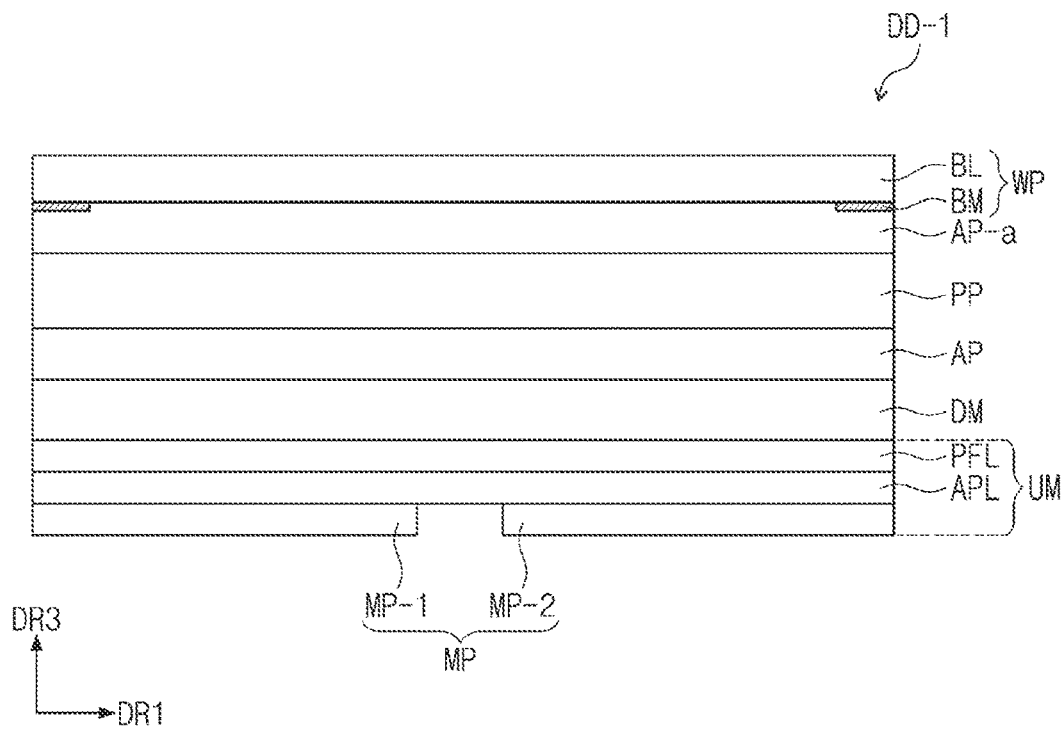
FIG. 8 is a cross-sectional view of a display device according to one or more embodiments of the present disclosure.

FIG. 8 is a cross-sectional view illustrating a display device according to one or more embodiments. Hereinafter, in describing the display device illustrated in FIG. 8, the duplicated features which have been described with reference to FIGS. 1A to 7C are not described again, but their differences will be mainly described.

The display device DD-1 illustrated in FIG. 8 may further include a light control layer PP and an optical adhesive layer AP-a, as compared with the display device DD described with reference to FIGS. 2 and 3. The display device DD-1 of one or more embodiments may further include the light control layer PP provided between an adhesive member AP and a protective member WP, and the optical adhesive layer AP-a provided between the light control layer PP and the protective member WP.

The light control layer PP may be provided on a display panel DP to control reflected light in the display panel DP due to external light. The light control layer PP may include, for example, a polarization plate and/or a color filter layer.

The optical adhesive layer AP-a may be an optically clear adhesive film (OCA) or an optically clear adhesive resin layer (OCR). The optical adhesive layer AP-a may be formed from a resin composition RC of one or more embodiments like the adhesive member AP (see FIG. 3) as described above. For example, the optical adhesive layer AP-a may be formed from the resin composition RC including a first urethane (meth)acrylate oligomer derived from a phosphate ester-containing polyol.

The optical adhesive layer AP-a formed from the resin composition RC of one or more embodiments may have a 180 degree peel strength of about 800 gf/25 mm or more at about 25° C. The optical adhesive layer AP-a may have a shear modulus of about $1.0 \times 10^3$ Pa to about $2.0 \times 10^5$ Pa at about −20° C. as measured according to JISK7244-6 method. The optical adhesive layer AP-a may have a shear modulus of about $0.02 \times 10^6$ Pa to about $0.05 \times 10^6$ Pa at about 60° C. as measured according to JISK7244-6 method. Accordingly, the optical adhesive layer AP-a may exhibit excellent or improved adhesive reliability.

Figure 9:
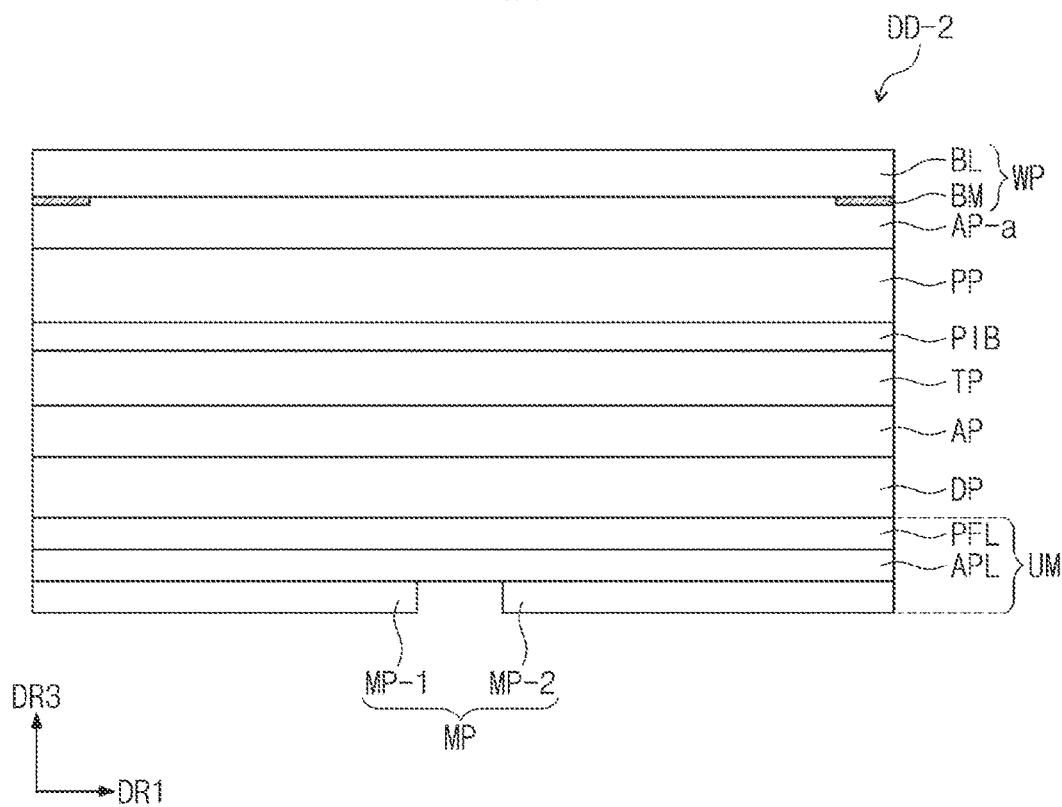
FIG. 9 is a cross-sectional view of a display device according to one or more embodiments of the present disclosure.

FIG. 9 is a cross-sectional view illustrating a display device according to one or more embodiments. Hereinafter, in describing the display device of one or more embodiments illustrated in FIG. 9, the duplicated features which have been described with reference to FIGS. 1A to 8 are not described again, but their differences will be mainly described.

The display device DD-2 of one or more embodiments illustrated in FIG. 9 may further include a light control layer PP, an optical adhesive layer AP-a, and an interlayer adhesive layer PIB as compared with the display device DD described with reference to FIGS. 2 and 3. The display device DD-2 of one or more embodiments may further include the light control layer PP provided between an adhesive member AP and a protective member WP, and the optical adhesive layer AP-a provided between the light control layer PP and the protective layer WP like the display device DD-1 of one or more embodiments illustrated in FIG. 8.

For the display device DD-2 of one or more embodiments, the adhesive member AP may be provided between a display panel DP and an input sensing unit TP. For example, the input sensing unit TP may not be provided directly on the display panel DP, and the display panel DP and the input sensing unit TP may be coupled to each other via the adhesive member AP. For example, the adhesive member AP may be provided between the encapsulation layer TFE (see FIG. 3) of the display panel DP and the input sensing unit TP.

The interlayer adhesive layer PIB may be provided to the bottom side of the light control layer PP. The interlayer adhesive layer PIB may be provided between the input sensing unit TP and the light control layer PP, and be formed of an adhesive material having superior (improved or suitable) anti-moisture permeability. For example, the interlayer adhesive layer PIB may include polyisobutylene. The interlayer adhesive layer PIB may be provided on the input sensing unit TP to prevent or reduce corrosion of sensing electrodes of the input sensing unit TP.

The display devices DD-1 and DD-2 of embodiments each may include the optical adhesive layer AP-a and the adhesive member AP formed from the resin composition RC of one or more embodiments. The display devices DD-1 and DD-2 including the optical adhesive layer AP-a and the adhesive member AP may exhibit excellent or improved reliability.

Hereinafter, with reference to Examples and Comparative Examples, a resin composition according to one or more embodiments of the present disclosure and an adhesive member formed from the resin composition will be described in more detail. However, Examples described below are only illustrations to assist the understanding of the present disclosure, and the scope of the present disclosure is not limited thereto.

EXAMPLES

1. Synthesis of Urethane (Meth)Acrylate Oligomer

In Synthetic Examples below, the measurement of molecular weight was carried out with Gel Permeation Chromatography (GPC) HLC-8420GPC manufactured by TOSOH Bioscience, LLC., TSKgel SuperHZM-N was used as a measurement column, and number-average molecular weight (Mn) values calibrated with standard polystyrene (PS) in an SEC curve detected in an RI detector were recorded.

(1) Synthesis of Urethane Acrylate UA-1

EXOLIT® OP 550 (66.0 g) (manufactured by CLARIANT, hydroxyl group: 170 mgKOH/g), a phosphate ester-containing polyol, Karenz AOI (28.2 g) (manufactured by SHOWA DENKO, 2-isocyanate ethyl acrylate), di-n-butyltin dilaurate (0.05 g) (manufactured by FUJIFILM Wako Pure Chemical Corporation), and acetonitrile (200 mL) were added to a separable flask equipped with a condenser tube, a magnetic stirrer, and a dry air inlet tube, and the reaction was carried out at about 60° C. for about 3 hours. After the disappearance of the absorption peak (2,260 cm$^{-1}$) of the isocyanate derived from Karenz AOI was confirmed through FT-IR, ethanol was added to terminate the reaction. The obtained solution was filtered and the solvent was removed to obtain UA-1 (94.0 g), a pale yellow transparent viscous liquid. The number-average molecular weight of the synthesized UA-1 was about 950.

(2) Synthesis of Urethane Acrylate UA-X$_1$

UA-X$_1$ (52.0 g) was obtained in substantially the same manner as in the synthesis of UA-1 except for using polyethylene glycol 600 (60.2 g) (manufactured by Tokyo Chemical Industry Co., Ltd., hydroxyl group: 186 mgKOH/g) instead of EXOLIT® OP 550 (66.0 g). The number-average molecular weight of the synthesized UA-X₁ was about 890. The synthesized UA-1 and UA-X₁ are shown in Table 1 below:

TABLE 1

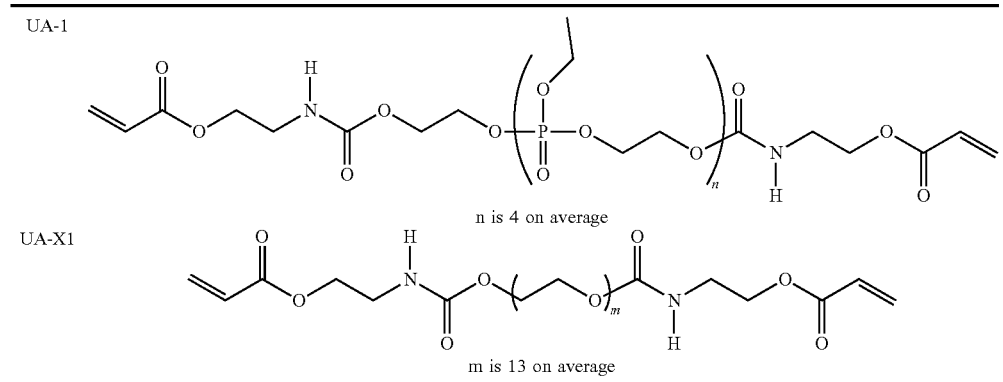

2. Preparation of Resin Composition

Resin compositions of Examples and Comparative Examples were prepared with the compound weight ratio listed in Table 2 (based on the total amount of the resin composition). Materials listed in Table 2 were provided to a heat-resistant light-shielding container in a weight ratio of each material. The materials were stirred at room temperature for about 12 hours by using a mix rotor in order to uniformly (or substantially uniformly) mix the composition. It was confirmed that the materials were uniformly (or substantially uniformly) blended, and a photoinitiator was additionally added. Then, the resulting mixture was stirred at room temperature for about 3 hours by using the mix rotor to prepare the resin compositions of Examples and Comparative Examples. Omnirad 819 (IGM Resin, Inc.) as the photoinitiator was provided in an amount of about 2 wt % with respect to the total weight of the resin composition.

Among the materials in Table 2, UA-1, UA-X₁, UF-C052, and UN6304 correspond to the urethane (meth)acrylate oligomer. More specifically, UA-1 corresponds to the first urethane (meth)acrylate oligomer synthesized from the phosphate ester-containing polyol. 2-EHA, EC-A, and 4-HBA correspond to the (meth)acrylate monomer.

3. Evaluation of Resin Composition and Adhesive Member

Viscosities of the resin compositions, reaction rates of the acryloyl group, shape maintenances, shear moduli of the adhesive members, and 180 degree peel strengths of Examples and Comparative Examples were evaluated, and the results are shown in Table 3 below. The reaction rate of the acryloyl group was obtained by evaluating the reaction rate of the acryloyl group in the resin composition and the preliminary adhesive member formed therefrom, and the shape maintenance was obtained by evaluating the shape maintenance of the preliminary adhesive member formed

TABLE 2

| Materials | Example 1 | Example 2 | Example 3 | Comparative Example 1 | Comparative Example 2 | Comparative Example 3 |
|---|---|---|---|---|---|---|
| UA-1 | 15 | 5 | 12 | — | — | — |
| UA-X1 | — | — | — | — | — | 5 |
| 2-EHA | 25 | 25 | 25 | 25 | 25 | 25 |
| EC-A | 25 | 25 | 25 | 25 | 25 | 25 |
| 4-HBA | 35 | 35 | 35 | 35 | 35 | 35 |
| UF-C052 | — | 10 | — | 15 | 10 | 10 |
| UN6304 | — | — | 3 | — | 5 | — |
| Omnirad 819 | 2 | 2 | 2 | 2 | 2 | 2 |

Data about Materials in Table 2

2-EHA: 2-ethylhexyl acrylate (manufactured by TOA-GOSEI Co., Ltd.)

EC-A: ethoxy-diethyleneglycol acrylate (manufactured by KYOEISHA CHEMICAL Co., Ltd.)

4-HBA: 4-hydroxybutyl acrylate (manufactured by Osaka Organic Chemical Industry, Ltd.)

UF-C052: polypropylene glycol-type urethane acrylate, number-average molecular weight: 10,000 (manufactured by KYOEISHA CHEMICAL Co., Ltd.)

UN6304: polytetramethylene glycol-type urethane acrylate, number-average molecular weight: 13,000 (manufactured by Negami Chemical Industrial Co., Ltd.)

from the resin composition. Hereinafter, the evaluation method will be described in more detail.

Viscosity of Resin Composition

The viscosity of the prepared resin composition was measured according to JIS K7117-2 method. The viscosity of the liquid resin composition was measured at about 25° C. and about 10 rpm to about 100 rpm by using a viscometer TVE-25L (manufactured by TOKI SANGYO Co., Ltd.).

Reaction Rate of Acryloyl Group

On a slide glass substrate, a resin composition was applied in a thickness of about 50 μm within a range of about 25 mm×75 mm with Deviceprinter-CX (manufactured by MICROJET), an inkjet device, and was irradiated with ultraviolet light so as to have a total amount of light of about 500 mJ/cm² by using a UV-LED lamp having a peak at about 365 nm, thereby forming a preliminary adhesive member.

The preliminary adhesive member was uniformly (or substantially uniformly) peeled off from the surface to the deep portion thereof with a spatula, and a spectrum was measured according to an attenuated total reflection (ATR) method among the FT-IR measurement methods. In some embodiments, the spectrum of the resin composition in a state before providing ultraviolet light was measured in the same method as above.

The height of the absorption peak near 1730 cm⁻¹ derived from the carbonyl group of the acryloyl group was set as an internal standard, and each height of the absorption peak near 810 cm⁻¹ derived from the carbon-carbon double bond of the acryloyl group was measured. Hereinafter, the reaction rate of the acryloyl group was calculated by Equation 1 below.

$$Z_1 = [(X_2/Y_2)/(X_1/Y_1)] \times 100\%$$ Equation 1

In Equation 1, $X_1$ is the height of absorbance of the carbon-carbon double bond of the acryloyl group as measured by FT-IR in the resin composition, and $X_2$ is the height of absorbance of the carbon-carbon double bond of the acryloyl group as measured by FT-IR in the preliminary adhesive member. $Y_1$ is the height of absorbance of the carbonyl group of the acryloyl group as measured by FT-IR in the resin composition, and $Y_2$ is the height of absorbance of the carbonyl group of the acryloyl group as measured by FT-IR in the preliminary adhesive member.

Shape Maintenance

On a slide glass, the prepared resin composition was applied in a thickness of about 50 μm within a range of about 25 mm×75 mm with Deviceprinter-CX (manufactured by MICROJET), an inkjet device. When applied, the resin composition was applied so that an opening with about 3 mmφ was formed at the center thereof. Then, the resin composition was irradiated with the ultraviolet light so as to have a total amount of light of about 500 mJ/cm² by using the UV-LED lamp having a peak at about 355 nm, thereby forming a preliminary adhesive member.

The shape of the opening was confirmed by DSX1000 (manufactured by OLYMPUS), a digital microscope, and then a 50 μm-thick PET film was temporarily attached thereto. The PET film was attached by applying a pressure of about 0.5 MPa at about 30° C. for about 5 minutes with ACS-230 (manufactured by Chiyoda Electric), an autoclave. Again, the exudation of liquid and changes in the shape of the opening in the preliminary adhesive member was observed with the digital microscope. In Table 3, "O" represents the case where there are no exudation of liquid and no changes in the shape of the opening, and "X" represents the case where there is the exudation of liquid and/or the changes in the shape of the opening.

Shear Modulus of Adhesive Member

A 500 μm-thick silicone sheet having an opening with a size of about 8.0 mmφ was used as a template, a peeling film was set on the bottom surface thereof, and the prepared resin composition was provided thereon. Then, the resin composition was irradiated with the ultraviolet light so as to have a total amount of light of about 500 mJ/cm² by using the UV-LED lamp having a peak at about 355 nm, thereby forming a preliminary adhesive member.

Thereafter, the peeling film was also attached on the top surface thereof, and was irradiated with the ultraviolet light so as to have a total amount of light of about 4,000 mJ/cm² by using the UV-LED lamp having a peak at about 395 nm, thereby forming an adhesive member and obtaining a circular measurement sample.

The prepared sample was installed on the probe of MCR 302 (manufactured by Anton-Paar), a stain-controlled rheometer, and a shear modulus (G') was measured by a torsional shear method according to JISK7244-6 method. The shear modulus was measured under the conditions of a frequency of 1 Hz, a temperature of −20° C. to 60° C., and a heating speed of 2° C./min.

180 Degree Peel Strength of Adhesive Member

On one surface on a slide glass substrate with a size of 76 mm×26 mm, the prepared resin composition was applied in a thickness of about 50 μm with Deviceprinter-CX (manufactured by MICROJET), an inkjet device. Then, the resin composition was irradiated with the ultraviolet light so as to have a total amount of light of about 500 mJ/cm² by using the UV-LED lamp having a peak at about 355 nm, thereby forming a preliminary adhesive member.

Thereafter, a PET film with a size of about 150 mm×20 mm and a thickness of about 50 μm was temporarily attached under a normal pressure by a laminator. The PET film was attached by applying a pressure of about 0.5 MPa at about 30° C. for about 5 minutes with ACS-230 (manufactured by Chiyoda Electric), an autoclave.

The PET film was irradiated with the ultraviolet light so as to have a total amount of light of about 4,000 mJ/cm² by using the UV-LED lamp having a peak at about 395 nm, thereby forming an adhesive member and obtaining a measurement sample. 180 degree peel strength of the measurement sample was measured according to JIS Z0237 method. The average value of the peel strength in a range from the peel initiation to 20-80 mm was recorded in Table 3.

TABLE 3

| Division | Example 1 | Example 2 | Example 3 | Comparative Example 1 | Comparative Example 2 | Comparative Example 3 |
| --- | --- | --- | --- | --- | --- | --- |
| Viscosity [mPa · s] | 13 | 18 | 14 | 17 | 21 | 19 |
| Reaction rate [%] of acryloyl group | 93 | 92 | 94 | 91 | 93 | 94 |
| Shape maintenance | O | O | O | X | O | O |
| Shear modulus [−20° C., Pa] | 0.19 × 10⁶ | 0.16 × 10⁶ | 0.17 × 10⁶ | 0.14 × 10⁶ | 0.15 × 10⁶ | 0.37 × 10⁶ |

TABLE 3-continued

| Division | Example 1 | Example 2 | Example 3 | Comparative Example 1 | Comparative Example 2 | Comparative Example 3 |
|---|---|---|---|---|---|---|
| Shear modulus [60° C., Pa] | $0.05 \times 10^6$ | $0.04 \times 10^6$ | $0.05 \times 10^6$ | $0.008 \times 10^6$ | $0.02 \times 10^6$ | $0.04 \times 10^6$ |
| 180 degree peel strength [gf/25 mm] | 875 | 900 | 805 | 870 | 720 | 690 |

Referring to Table 3, it may be seen that the resin compositions of Examples 1 to 3 exhibit a viscosity of about 5.0 mPa·s to about 20.0 mPa·s at about 25° C., and the reaction rate of the acryloyl group after providing the first light is about 90% or more. It may be seen that the preliminary adhesive members formed from the resin compositions of Examples 1 to 3 have stable or suitable shape maintenance. It may be seen that the adhesive members formed from the resin compositions of Examples 1 to 3 have a shear modulus of about $1.0 \times 10^3$ Pa to about $2.0 \times 10^5$ Pa at about −20° C., and a 180 degree peel strength of about 800 gf/25 mm or more. It may be seen that the adhesive members formed from the resin compositions of Examples 1 to 3 have a shear modulus of about $0.02 \times 10^6$ Pa to about $0.05 \times 10^6$ Pa at about 60° C.

The resin compositions of Examples 1 to 3 include UA-1 corresponding to the first urethane (meth)acrylate oligomer in the present disclosure, and the first urethane (meth)acrylate oligomer is derived from the phosphate ester-containing polyol. UA-1, which is the first urethane (meth)acrylate oligomer, includes a phosphate ester group, the cohesiveness of materials may be improved due to the polarity of the phosphate ester group. Therefore, it is believed that the preliminary adhesive member formed from the resin composition of Examples 1 to 3 including UA-1 has good or suitable wettability, and thus exhibits excellent or improved shape maintenance. In some embodiments, it is believed that the adhesive member formed from the resin composition of Examples 1 to 3 including UA-1 exhibits excellent or improved shear modulus.

In some embodiments, it is believed that UA-1, the first urethane (meth)acrylate oligomer, does not include a hydroxy group, partially includes an ethylene glycol chain, and thus maintains a good or suitable polarity. Therefore, the resin composition including the urethane (meth)acrylate oligomer derived from the phosphate ester-containing polyol according to an example may have a suitable viscosity to be provided by an inkjet printing method and/or a dispensing method. In some embodiments, the adhesive member including the polymer derived from the resin composition of an example may exhibit excellent or suitable adhesive reliability.

The resin composition of Comparative Example 1 includes UF-C052, a polypropylene glycol-type urethane acrylate oligomer. The preliminary adhesive member formed from the resin composition of Comparative Example 1 had a significant change in the shape thereof, and the exudation of liquid occurred. In some embodiments, the adhesive member formed from the resin composition of Comparative Example 1 had a radical change in shear modulus when the temperature was raised from room temperature to higher temperature. It may be seen that the adhesive member formed from the resin composition of Comparative Example 1 has a shear modulus of less than about $0.02 \times 10^6$ Pa at about 60° C. It is believed that the resin composition of Comparative Example 1 includes UF-C052, and thus the adhesive member formed from the resin composition of Comparative Example 1 has reduced crystallinity and insufficient cross-link.

The resin composition of Comparative Example 2 includes UN6304, a polypropylene glycol-type urethane acrylate oligomer. In Table 3, it may be seen that the resin composition of Comparative Example 2 exhibits a viscosity of greater than about 20.0 mPa·s (e.g., 21 mPa·s) at about 25° C., and thus is not suitable to be provided by an inkjet printer. In some embodiments, it may be seen that the adhesive member formed from the resin composition of Comparative Example 2 has a 180 degree peel strength of less than about 800 gf/25 mm. It is believed that the preliminary adhesive member formed from the resin composition of Comparative Example 2 has low wettability, and thus the adhesive member formed by curing the preliminary adhesive member has reduced adhesive reliability. It is believed that the resin composition of Comparative Example 2 includes UF-C052 and UN6304 which are amphoteric, and thus has an increase in viscosity and a decrease in 180 degree peel strength. In some embodiments, when UF-C052 and UN6304 are used together as materials for the resin composition, a composition ratio and a weight range of each of UF-C052 and UN6304 are not easily controlled, and the formulation freedom is low.

Referring to Table 3, it may be seen that the adhesive member formed from the resin composition of Comparative Example 3 exhibits a shear modulus of greater than about $2.0 \times 10^5$ Pa at about −20° C. and a 180 degree peel strength of less than about 800 gf/25 mm. The resin composition of Comparative Example 3 includes UA-$X_1$, and UA-$X_1$ is a urethane acrylate oligomer without including a phosphate ester group. Accordingly, it is believed that the adhesive member formed from the resin composition of Comparative Example 3 exhibits high crystallinity, and thus the shear modulus greatly increases and the 180 degree peel strength is reduced.

The resin composition of the present embodiments may include at least one urethane (meth)acrylate oligomer, at least one (meth)acrylate monomer, and at least one photoinitiator. The urethane (meth)acrylate oligomer may include the first urethane (meth)acrylate oligomer derived from the phosphate ester-containing polyol, and the first urethane (meth)acrylate oligomer may have a number-average molecular weight of about 805 to about 955. Thus, the resin composition of one or more embodiments may exhibit a suitable viscosity to be provided by an inkjet printing method and/or a dispensing method.

The method of manufacturing an adhesive member of the present embodiments may include providing the resin composition of the present embodiments. The method of manufacturing an adhesive member of the present embodiments may include providing a resin composition, then forming a preliminary adhesive member from the resin composition, and forming an adhesive member from the preliminary adhesive member. Accordingly, the method of manufacturing an adhesive member of the present embodiments may have improved manufacture reliability, and the adhesive member manufactured by the method may exhibit excellent or improved adhesive reliability and shape maintenance.

The display device of an example may include a lower module, a display panel provided on the lower module, a protective member provided on the display panel, and an adhesive member. The adhesive member may be provided between the lower module and the display panel, between display panel and the protective member, or on (e.g., as part of) the lower module, and may include a polymer derived from the resin composition of the present embodiments. The adhesive member including the polymer derived from the resin composition of the present embodiments may exhibit excellent or improved shear modulus and 180 degree peel strength characteristics, and the display device including the adhesive member may exhibit excellent or suitable reliability.

The resin composition of one or more embodiments may include a urethane (meth)acrylate oligomer derived from a phosphate ester-containing polyol, thereby exhibiting the characteristics of a low viscosity before being cured and excellent or improved shear modulus and peel strength after being cured.

The method of manufacturing an adhesive member of one or more embodiments may include providing the resin composition of one or more embodiments, thereby improving the manufacture reliability.

The display device of one or more embodiments may include the adhesive member formed from the resin composition of one or more embodiments, thereby exhibiting excellent or suitable reliability.

The display and/or any other relevant devices or components according to embodiments of the present invention described herein may be implemented utilizing any suitable hardware, firmware (e.g. an application-specific integrated circuit), software, or a combination of software, firmware, and hardware. For example, the various components of the device may be formed on one integrated circuit (IC) chip or on separate IC chips. Further, the various components of the device may be implemented on a flexible printed circuit film, a tape carrier package (TCP), a printed circuit board (PCB), or formed on one substrate. Further, the various components of the device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

Although the present disclosure has been described with reference to certain embodiments of the present disclosure, it will be understood that the present disclosure should not be limited to these embodiments but various changes and modifications can be made by those skilled in the art without departing from the spirit and scope of the present disclosure.

Accordingly, the technical scope of the present disclosure is not intended to be limited to the contents set forth in the detailed description of the specification, but is intended to be defined by the appended claims and their equivalents.

What is claimed is:

1. A resin composition comprising:
   at least one urethane (meth)acrylate oligomer;
   at least one (meth)acrylate monomer; and
   at least one photoinitiator,
   wherein the urethane (meth)acrylate oligomer comprises a first urethane (meth)acrylate oligomer derived from a phosphate ester-containing polyol, the phosphate ester-containing polyol being represented by Formula 1, and the first urethane (meth)acrylate oligomer has a number-average molecular weight of about 805 to about 955:

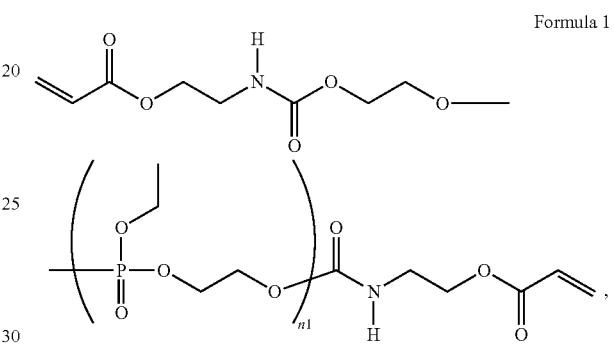

Formula 1 and
   wherein, in Formula 1, n1 is 3 or 4.

2. The resin composition of claim 1, wherein the (meth)acrylate monomer has a weight percent of about 80 wt % to about 90 wt % with respect to a total weight of the resin composition.

3. The resin composition of claim 1, wherein a viscosity at about 25° C. as measured according to JIS K7117-2 method is about 5.0 mPa·s to about 20.0 mPa·s.

4. The resin composition of claim 1, wherein a shear modulus (G') at about −20° C. as measured according to JISK7244-6 method after the resin composition is UV-cured is about $1.0 \times 10^3$ Pa to about $2.0 \times 10^5$ Pa.

5. The resin composition of claim 1, wherein the urethane (meth)acrylate oligomer further comprises a second urethane (meth)acrylate oligomer comprising two hydroxy groups.

6. The resin composition of claim 1, wherein the photoinitiator comprises a radical polymerization initiator.

7. A method of manufacturing an adhesive member, the method comprising:
   providing, on a substrate, a resin composition comprising at least one urethane (meth)acrylate oligomer, at least one (meth)acrylate monomer, and at least one photoinitiator;
   providing first light to the resin composition to form a preliminary adhesive member; and
   providing second light to the preliminary adhesive member to form an adhesive member,
   wherein the urethane (meth)acrylate oligomer comprises a first urethane (meth)acrylate oligomer derived from a phosphate ester-containing polyol, the phosphate ester-containing polyol being represented by Formula 1, and the first urethane (meth)acrylate oligomer has a number-average molecular weight of about 805 to about 955:

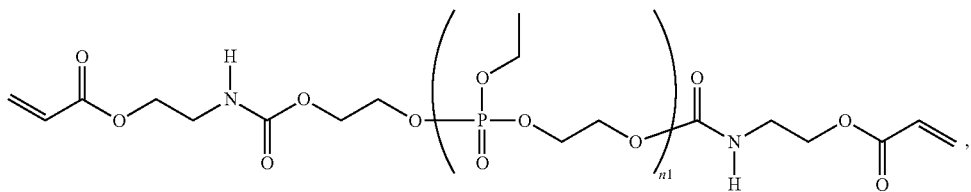

Formula 1 and
wherein, in Formula 1, n1 is 3 or 4.

8. The method of claim 7, further comprising providing a protective member on the preliminary adhesive member after the providing of first light to the resin composition to form the preliminary adhesive member,
  wherein the second light is configured to pass through the protective member and be provided to the preliminary adhesive member.

9. The method of claim 7, wherein at least one of the urethane (meth)acrylate oligomer or the (meth)acrylate monomer comprises an acryloyl group, and a reaction rate of the acryloyl group in response to the providing of the first light is about 90% or more.

10. The method of claim 9, wherein the reaction rate of the acryloyl group satisfies Equation 1:

Equation 1

$$Z_1 = [(X_2/Y_2)/(X_1/Y_1)] \times 100\%,$$ and      Equation 1 wherein, in Equation 1,
$X_1$ is a height of absorbance of a carbon-carbon double bond ($H_2C=CH-*$) of the acryloyl group as measured by Fourier-transform infrared spectroscopy (FT-IR) in the resin composition, $X_2$ is a height of absorbance of a carbon-carbon double bond ($H_2C=CH-*$) of the acryloyl group as measured by FT-IR in the preliminary adhesive member, $Y_1$ is a height of absorbance of a carbonyl group

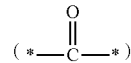

of the acryloyl group as measured by FT-IR in the resin composition, and $Y_2$ is a height of absorbance of a carbonyl group of the acryloyl group as measured by FT-IR in the preliminary adhesive member.

11. The method of claim 7, wherein the resin composition is provided by an inkjet printing method or a dispensing method.

12. The method of claim 7, wherein a total amount of the first light is about 450 mJ/cm² to about 550 mJ/cm², and a total amount of the second light is about 3,500 mJ/cm² to about 4,500 mJ/cm².

* * * * *